(12) United States Patent
Hayakawa

(10) Patent No.: US 6,738,412 B1
(45) Date of Patent: May 18, 2004

(54) MOBILE COMMUNICATIONS DEVICE, COMMUNICATIONS SYSTEM, AND COMMUNICATIONS METHOD

(75) Inventor: Tadashi Hayakawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/557,417

(22) Filed: Apr. 21, 2000

(30) Foreign Application Priority Data

Apr. 21, 1999 (JP) .......................................... 11-113720

(51) Int. Cl.[7] ................................................ H04B 1/69
(52) U.S. Cl. ...................................................... 375/130
(58) Field of Search ................................. 375/133, 130, 375/142, 141, 150; 370/320, 335, 342, 441; 455/132, 436, 561, 442

(56) References Cited

U.S. PATENT DOCUMENTS

| | | | |
|---|---|---|---|
| 5,504,776 A | | 4/1996 | Yamaura et al. |
| RE36,591 E | * | 2/2000 | Hayashi et al. ............. 370/342 |
| 6,119,004 A | * | 9/2000 | Yamada et al. ............. 455/436 |
| 6,137,786 A | * | 10/2000 | Ariyoshi et al. ............. 370/335 |
| 6,377,606 B1 | * | 4/2002 | Toskala et al. ............. 375/130 |
| 6,463,091 B1 | * | 10/2002 | Zhodzicshsky et al. ..... 375/149 |
| 6,526,036 B1 | * | 2/2003 | Uchida et al. ............... 370/342 |
| 6,553,059 B1 | * | 4/2003 | Ito ............................... 375/150 |

FOREIGN PATENT DOCUMENTS

JP        6-14006        1/1994

* cited by examiner

*Primary Examiner*—Emmanuel Bayard
(74) *Attorney, Agent, or Firm*—Pearne & Gordon LLP

(57) ABSTRACT

A mobile communications device having control means for controlling communication and communications means for establishing data communication with respect to a cell station, wherein the communications means comprises: chip clock signal generation means for generating a chip clock signal fc; an antenna radio circuit for receiving and transmitting information; spreading code generation means for generating a spreading code on the basis of the chip clock signal fc output from the chip clock signal generation means; despreading means for despreading a signal S received by the antenna radio circuit; correlation output means for extracting a correlation output P from the signal despread by the despreading means; and spreading means for spreading a transmission signal on the basis of the spreading code.

20 Claims, 14 Drawing Sheets

MOBILE COMMUNICATIONS DEVICE, COMMUNICATIONS SYSTEM, AND COMMUNICATIONS METHOD

BACKGROUND OF THE INVENTION

The present invention relates to a mobile communications device, a communications system, and a communications method for use in mobile communication, and more particularly, to a mobile communications device, a communications system, and a communications method which utilize the spread-spectrum communication technique.

In a mobile communications system utilizing a commonly-employed spread-spectrum communications system in which communication is established between a cell station and a mobile station, a system of the cell station fixes a transmission chip rate fc of the communication, and a transmission symbol rate fv is determined and fixed each time a call involving an individual mobile station is established. More specifically, a spreading rate N (=despreading rate Nr) of spread-spectrum communication is fixed each time a call involving a mobile station is established. Here, the spreading rate N (=despreading rate Nr) corresponds to a ratio of a chipping rate to a symbol rate.

In the common spread-spectrum communications system, communication between a cell station and a mobile station is synchronized and maintained, by means of the mobile station fixing the chipping rate fc for spreading/despreading.

In order to address a problem of a loss of synchronism of chips between a cell station and a mobile station stemming from high-speed movement of the mobile station, as well as to effect RAKE receiving for improving reception sensitivity, data to be used for defining the relationship between a phase and a correlation output over a spreading code period are prepared in the form of a delay profile. The delay profile corresponds to a relationship between the phase $\psi$ and a correlation output $P(\psi)$ determined by means of measurement of a correlation output P over all phases within the spreading code period.

FIG. 10 is a plot showing the relationship between a phase $\psi$ and a correlation output $P(\psi)$. As shown in FIG. 10, from the delay profile a plurality of phases $\psi i$ for which a correlation output $P(\psi i)$ is sufficiently greater than noise are determined as a receiving paths. At the time of normal demodulation, the initial phase of a despreading code is synchronized with the phase $\psi i$, thus effective despreading a received signal. Here, the phase $\Theta$ of the largest correlation output P ($\Psi 0=\Theta$) is particularly called a "principal wave."

As mentioned above, in the common spread-spectrum communications system, a mobile station periodically prepares a delay profile, thus detecting and updating the phase $\Psi i$ of a despreading operation to be performed at the time of a normal demodulation operation.

A correlation output P is determined by means of setting into a parallel correlator a despreading code (=a spreading code) C having the characteristic of a pseudorandom number, inputting a received BB signal into a matched filter, where the signal is despread, and detecting a resultant correlation output.

As mentioned above, in the common spread-spectrum communications system, there is prepared a delay profile for defining the relationship between a phase and a correlation output over the entire a spreading code period, to thereby maintain synchronization between a mobile station and a cell station; that is, to prevent loss of synchronism between chips, which would otherwise be caused by a high-speed movement of the mobile station. Preparation of the delay profile (see FIG. 10) for preventing loss of synchronism between chips, which would otherwise be caused by high-speed travel of the mobile station, is performed at a period Td shorter than a period T during which loss of synchronism between chips arises.

FIG. 11 is a plot showing the relationship between the correlation output P and a phase T. As shown in FIG. 11, in order to prevent a failure to detect a path, a phase-shift unit Ts to be used for determining a correlation output P for preparing a delay profile must be narrower than a phase width Tp in which a correlation is output.

In the common spread-spectrum communications system, a transmitter uses a code C having the characteristic of a pseudorandom number as a spreading code, whereas a receiver despreads a received code while the spreading code C transmitted from the transmitter is used as a despreading code.

FIGS. 12A and 12B are plots showing the relationship between the correlation output P and the phase $\Theta$. FIG. 12A is a discrete model case and shows the relationship between a correlation output P and a phase $\Theta$, and FIG. 12B is a continuous model case and shows the relationship between a correlation output P and a phase $\Theta$.

For the sake of simplicity, there will now be described a discrete model case, in which chips are in phase with each other and the width of one step phase ts of a sample to be correlated corresponds to one chip bit (or a chipping period Tc). Here, assume that the phase width Tp of the discrete model corresponds to one chip bit (or the chipping period Tc) and that a chip rate is taken as Fc.

FIG. 13 is an illustration showing the relationship between a despreading code C and a spreading code of a received signal in a case where chips are in phase with each other. As shown in FIG. 13, in the conventional spread-spectrum communications system, in a case where the despreading code C is synchronized with a received signal, the chance of a match arising between bit data assumes a value of 100%, and the chance of a disparity arising between bit data assumes a value of 0%. An expected value of a "match/disparity" for each bit assumes a value of 1 (i.e., 100%).

FIG. 14 shows the relationship between the despreading code C and the spreading code of the received signal in a case here chips are out of phase with each other by one bit. As shown in FIG. 14, in a case where the despreading code C is out of phase with the spreading code of a received signal; for example, where the despreading code C is out of phase with the spreading code of a received signal by only one bit, the chance of a match arising between transmitted data and received data is ½ (50%) and the chance of a discrepancy arising between transmitted data and received data is ½ (50%), because the despreading code C has the characteristic of a pseudorandom number. Accordingly, an expected value of a "match/disparity" for each bit assumes a value of 0 (i.e., 0%).

However, as shown in FIG. 11, in the common spread-spectrum communications system, the number of times (N) detection and calculation of a correlation output required for preparing a single delay profile is performed assumes a theoretical minimal value of N/2 (times) and actually assumes a value of 4N (times), with respect to the number of bits (N) of the spreading code C. Consequently, a CPU (central processing unit) or a DSP (digital signal processor) of the mobile station requires a much longer processing time and a larger processing load is imposed thereon. Further, in order to store the resultant detected and calculated correlation output $P(\psi)$, memory requires larger storage capacity, thereby rendering the spread-spectrum communications system costly.

Longer processing time required for and a larger processing load imposed on a CPU or a DSP and an increase in the storage capacity of memory result in an increase in the power to be dissipated by a mobile station, thus hindering lengthening of a communication time or a call-await time.

In the common spread-spectrum communications system, in principle, only the mobile station can effect a countermeasure against lack of synchronism between chips, thus imposing difficulty in effecting an effective countermeasure against lack of synchronism between chips.

SUMMARY OF THE INVENTION

The present invention has been conceived in light of the drawbacks of the background art and is aimed at providing a mobile communications system, a communications system, and a communications method which effectively and readily enable selection of processing capability and resources of a mobile station and less-costly lengthening of a communication time or a call-await time.

To solve the drawbacks, the present invention provides a mobile communications device having control means for controlling communication and communications means for establishing data communication with respect to a cell station, wherein the communications means comprises: chip clock signal generation means for generating a chip clock signal fc; an antenna radio circuit for receiving and transmitting information; spreading code generation means for generating a spreading code on the basis of the chip clock signal fc output from the chip clock signal generation means; despreading means for despreading a signal s received by the antenna radio circuit; correlation output means for extracting a correlation output P from the signal despread by the despreading means; and spreading means for spreading a transmission signal on the basis of the spreading code.

Preferably, the mobile communications device further comprises computation means for preparing a delay profile on the basis of the correlation output P; a user interface for enabling entry of data or indication of information; storage means for storing data or a program; power level detection means for detecting the level of power remaining in a power source, such as a battery; or speed detection means for detecting the traveling speed of the mobile communications device.

Preferably, the control means controls the chip clock signal generation means such that the chip clock signal fc is determined on the basis of a signal entered by way of the user interface or such that the chip clock signal fc is determined on the basis of the data stored in the storage means. Preferably, the control means controls the chip clock signal generation means such that the chip clock signal fc is determined on the basis of a target value W of the power consumed by the mobile communications device. The target power consumption value W may be determined on the basis of a signal entered by way of the user interface or the data stored in the storage means.

Preferably, the control means determines the target power consumption value W according to Equation (W=E/t) on the basis of a power level E detected by the power level detection means and a predetermined time "t." Further, preferably, the control means determines the predetermined time "t" in accordance with a mode selection signal for selecting either a long-hour operation mode or a short-hour operation mode. Preferably, the control means sets the target power consumption value W to a target power consumption value W0 employed during a call-await time. Preferably, the control means sets the target power consumption value W to a target power consumption value W0 employed during a call-await time and the predetermined time "t" to a target call-await time. More preferably, the control means sets the target power consumption value W to a target power consumption value W1 employed during communication. Preferably, the control means sets the target power consumption value W to a target power consumption value W1 employed during communication and the predetermined time "t" to a target available time.

Preferably, the control means controls the chip clock signal generation means such that the chip clock signal fc is determined by Equation (fc=(W-b)/a, where "a" and "b", are predetermined constants). More preferably, the control means updates the target power consumption value W at initiation of the call-await time of the mobile communications device or at commencement of communication.

Preferably, the control means controls the chip clock signal generation means such that the chip clock signal fc is determined on the basis of the time T during which a receiving path of the received signal S is brought out of phase with the spreading code. At this time, the control means preferably controls the chip clock generation means such that the chip clock signal fc is determined so as to set the time T to a predetermined target value T0. Preferably, the control means controls the chip clock signal generation means such that the target value T0 assumes a value of predetermined value T1 or more and a predetermined value T2 or less (T1≦T0≦T2). Preferably, the control means calculates the predetermined value T1 according to Equation (T1=λc/V) on the basis of data V pertaining to the traveling speed of the mobile communications device detected by the speed detection means and a code wavelength λc of the chip clock signal fc. Further, the 20 control means preferably controls the chip clock signal generation means such that the chip clock signal fc is determined according to Equation (fc=kc/T, where "kc" is a predetermined constant).

Preferably, the control means may control the chip clock signal generation means such that the chip clock signal fc is determined on the basis of a period Td at which the computation means prepares a delay profile. At this time, the control means may calculate the period Td on the basis of the time T, according to Equation (Td=ke×T, where "ke" is a constant satisfying 0<ke<1) and control the chip clock signal generation means such that the chip clock signal fc is determined according to Equation (fc=kd/T, where "kd" is a predetermined constant.

Preferably, the control means can also control the chip clock signal generation means such that the chip clock signal fc is determined on the basis of a predetermined spreading rate N and a predetermined data transmission symbol rate fv. Here, the control means may control the chip clock signal generation means such that the chip clock signal fc is determined according to Equation (fc=fv/N).

Preferably, the control means can control the chip clock signal generation means such that the chip clock signal fc is determined on the basis of a communication rate M at which the communication device is charged. At this time, the control means preferably controls the chip clock signal generation means such that the chip clock signal fc is determined according to Equation (fc=km/M-α, where "km"

is a predetermined value satisfying 0<km, and α is a predetermined value satisfying 0≦α).

Preferably, the control means calculates a synchronous sample rate fs of the computation means from the amount of memory Me required for storing the delay profile prepared by the computation means and controls the chip clock signal generation means such that the chip clock signal fc is determined on the basis of the synchronous sample rate fs. Further, the control means preferably calculates a synchronous sample rate fs of the computation means from the amount of computation Mi required for the computation means to compute the delay profile and controls the chip clock signal generation means such that the chip clock signal fc is determined on the basis of the synchronous sample rate fs.

Preferably, the control means selects the chip clock signal fc generated by the chip clock generation means from the group comprising: a value calculated from the target power consumption value W of the mobile communications device, a value calculated on the basis of the time T during which the receiving path of the received signal S is brought out of phase with the spreading code, a value calculated on the basis of the predetermined spreading rate N and the predetermined data transmission symbol rate fv, a value calculated on the basis of the period Td during which the computation means prepares a delay profile, a value calculated from a communications rate M, a value calculated on the basis of the amount of memory Me required for storing the delay profile prepared by the computation means, and a value calculated on the basis of the amount of computation Mi required for the computation means to calculate a delay profile. At this time, according to the state of communication, the control means desirably selects the value of the chip clock signal fc so as to reduce the amount of hardware resources of the mobile communications device required, the communication rate M, or the amount of radio resources occupied. Preferably, the mobile communications device further comprises a user interface for enabling entry of data or indication of information and wherein the control means calculates, on the basis of the value of the selected chip clock signal fc, the target power consumption value W, the time T, the spreading rate N, the data transmission symbol rate fv, the period Td, the communication rate M, the amount of memory used Me, and the amount of computation required Mi, controls the user interface such that the user interface displays these values, and re-calculates these values in a case where a modified value of the chip clock signal fc is entered by way of the user interface.

To solve the drawbacks, the present invention also provides a mobile communications device having control means for controlling communication and communications means for establishing data communication with respect to a cell station, wherein the communications means comprises: first chip clock signal generation means for generating a first chip clock signal Fc; transceiver means for effecting transmission of information; and sync-detection-and-maintaining means for preparing a delay profile, and the sync-detection-and-maintaining means comprises: despreading code generation means for generating a first despreading code C on the basis of the first chip clock signal Fc output from the first chip clock signal generation means and despreading information output from the control means; chip clock signal generation means for generating a chip clock signal fc on the basis of the first chip clock signal Fc output from the first chip clock signal generation means; operation clock signal generation means for generating an operation clock signal fs on the basis of the clock rate value output from the control means; latch means for generating a second despreading code C' by means of latching the first despreading code C; a parallel correlator which extracts a correlation output P from a signal S received by the transceiver means on the basis of the second despreading code C' and the operation clock signal fs; and computation means for preparing a delay profile on the basis of the correlation output P.

Preferably, the latch means samples data, on the basis of the chip clock signal fc, data are sampled every "n" bits with respect to the first despreading code C, and makes values of the thus-sampled bits continuous to a length corresponding to "n" bits, to thereby produce the second despreading code C'. Further, the latch means can divide, on the basis of the chip clock signal fc, the first despreading code C into "m", through "n" bit blocks, sample arbitrary bits which are present in the blocks, and make the thus-sampled bit data sets continuous to a length corresponding to the number of bits of the blocks of interest, to thereby produce the second despreading code C'. Further, the latch means preferably may divide the first despreading code C at bit positions corresponding to integral multiples of constant R, which is a real number of one or more. At this time, the latch means preferably sets the constant R to be an integer by means of rounding down, up, or off the fractional portion of integral multiples of constant R, thus determining the bit positions through use of the integer.

Preferably, the latch means divides, on the basis of the chip block signal fc, the first despreading code C into blocks of integral "n" bits, samples arbitrary bits which are present in the blocks, and makes the thus-sampled bit data continuous to a length corresponding to the number of bits provided in the blocks of interest, to thereby produce the second despreading code C'. Alternatively, the latch means may sample, on the basis of the chip clock signal fc, bits which are present at predetermined locations within a block of the first despreading code C and make the thus-sampled bits continuous to a length corresponding to the number of bits provided in the blocks of interest, to thereby produce the second despreading code C'. At this time, the latch means preferably takes bits located at the predetermined positions as leading bits of the respective blocks.

To solve the drawbacks, the present invention also provides a mobile communications device having control means for controlling communication and communications means for establishing data communication with respect to a cell station, wherein the communications means comprises: first chip clock signal generation means for generating a first chip clock signal Fc; transceiver means for effecting transmission of information; and sync-detection-and-maintaining means for preparing a delay profile, and the sync-detection-and-maintaining means comprises: despreading code generation means for generating a first despreading code C on the basis of the first chip clock signal Fc output from the first chip clock signal generation means and despreading information output from the control means; chip clock signal generation means for generating a chip clock signal fc on the basis of the first chip clock signal Fc output from the first chip clock signal generation means; operation clock signal generation means for generating an operation clock signal fs on the basis of the clock rate value output from the control means; latch means for generating a latched received signal S' by means of latching, in accordance with the chip clock signal fc, the signal S received by the transceiver means; a parallel correlator which extracts a correlation output P from a signal S received by the transceiver means on the basis of the first despreading code C and the operation clock signal fs; and computation means for preparing a delay profile on the basis of the correlation output P.

Preferably, the latch means latches, on the basis of the chip clock signal fc, a code sequence D of the received signal S, to thereby produce a code sequence D', whereby a latched received signal S' having a code sequence D' is produced. At this time, the latch means preferably latches, on the basis of the chip clock signal fc, data every "n" bits with respect to the code sequence D and makes values of the thus-sampled bits continuous to a length corresponding to "n" bits, to thereby produce the code sequence D'. Alternatively, the latch means preferably divides, on the basis of the chip clock signal fc, the code sequence D into "m" through "n" bit blocks, samples arbitrary bits which are present in the blocks, and makes the thus-sampled bits continuous to a length corresponding to the number of bits of the blocks of interest, to thereby produce the code sequence D'. Further, the latch means preferably divides the code sequence D into blocks at bit positions corresponding to integral multiples of constant R, which is a real number of one or more. At this time, the latch means preferably sets the constant R to be an integer by means of rounding down, up, or off the fractional portion of integral multiples of constant R, and determines the bit positions through use of the integer.

Preferably, the latch means can divide, on the basis of the chip block signal fc, the code sequence D into blocks of integral "n" bits, sample arbitrary bits which are present in the blocks, and make the thus-sampled bit data continuous to a length corresponding to the number of bits provided in the blocks of interest, to thereby produce the code sequence D'. Alternatively, the latch means can also sample, on the basis of the chip clock signal fc, bits which are present at predetermined locations within a block of the code sequence D and makes the thus-sampled bits continuous to a length corresponding to the number of bits provided in the blocks of interest, to thereby produce the code sequence D'. At this time, the latch means preferably takes bits located at the predetermined positions as leading bits of the respective blocks.

Preferably, the control means spreads transmission data on the basis of the first chip clock signal Fc and the first despreading code C and despreads received data on the basis of the chip clock signal Fc and the first despreading code C.

Preferably, the control means can determine the target communication quality value Q0. Further, the mobile communications device preferably comprises a user interface for enabling entry of data or indication of information, and the control means may determine the target communication quality value Q0 on the basis of a signal entered by way of the user interface.

Preferably, the control means can calculate the quality Q of current communication and monitor whether or not the communication quality Q is deteriorated when compared with the target communication quality value Q0.

Preferably, the control means can determine a data transmission symbol rate fv for communication. Further, the control means can determine the communication data transmission symbol rate fv the basis of a signal entered by way of the user interface. Preferably, the control means determines the data transmission symbol rate fv on the basis of the spreading rate N and the chip rate fc and can calculate the data transmission symbol rate fv according to Equation (fv=fc/N) and determines the thus-calculated data transmission symbol rate fv.

To solve the drawbacks, the present invention further provides a communications system including a plurality of mobile communications devices for transmitting and receiving information by means of communication, a cell station which receives communication requests output from the plurality of mobile communications devices and controls communication between the mobile communications devices, and a control station for calculating a communication rate Mat which the plurality of mobile communications devices are charged, wherein the mobile communications devices correspond to the mobile communications device as defined in any one of claims 1 through 69, and the cell station adopts a different chip clock signal fc for the communication established by each of the mobile communications devices.

Preferably, the mobile communications device sends the cell station a data transmission symbol rate fv, a target communication quality value Q0, and a chip rate fc; the cell station has communication initiation-and-determination means for determining whether or not communication is available, on the basis of the data transmission symbol rate fv, the target communication quality value Q0, and the chip rate fc output from the mobile communications device; and the control station has communication rate calculation means for calculating a communication rate M on the basis of the chip rate fc output from the cell station.

Preferably, the communication rate calculation means of the control station calculates a communication rate on the basis of the chip rate fc, according to Equation (M=km/fc+α or M=km×fc+α, where "km", is a constant satisfying 0<km, and α is a constant satisfying 0≦α).

Preferably, the communication initiation-and-determination means of the cell station can determine, with respect to the mobile communications device, a data transmission symbol rate fv', a target communication quality value Q0', and a chip rate fc', which enable approval of communication.

Preferably, in a case where the quality Q of communication established with respect to the mobile communication device is inferior to the target communication quality value Q0, the cell station has transmission power calculation means which updates power Pw used for transmitting a signal to the mobile communications device by means of changing the chip rate fc, to thereby cause the communication quality Q to satisfy the target communication quality value Q0. At this time, the transmission power calculation means can calculate a communication rate on the basis of the chip rate fc, according to Equation (Pw=kp/fc+β, where "kp" is a constant satisfying 0<km, and β is a constant).

Preferably, the communications system corresponds to a spread-spectrum communications system, and the spread-spectrum communications system desirably corresponds to a code division multiple access (CDMA) communications system.

To solve the drawbacks, the present invention also provides a communications method to be performed by: a plurality of mobile communications devices for transmitting and receiving information by means of communication, a cell station which receives communication requests output from the plurality of mobile communications devices and controls communication between the mobile communications devices, and a control station for calculating a communication rate M at which the plurality of mobile communications devices are charged, the method comprising the steps of: causing a mobile communications device for issuing a communication request to determine and send, to the cell station, a data transmission symbol rate fv, a target communication quality value Q0, and a chip rate fc; causing the cell station to determine whether or not communication is available, on the basis of the data transmission symbol rate fv, the target communication quality value Q0, and the chip rate fc; causing the control station to determine the communication rate M on the basis of the chip rate fc in a case where communication is available; causing the mobile communications device to determine whether to start communication, on the basis of the communication rate, as well as an optimum chip rate fc; causing the mobile communications device to monitor communication quality Q; and determining a plurality of communication parameters on the basis of the chip rate fc, to thereby maintain communication through use of the plurality of communication parameters.

Preferably, in a case where it is determined that communication requiring the data transmission symbol rate fv, the target communication quality value Q0, and the chip rate fc is disapproved, the step of determining whether or not communication is available involves repetition of steps of: sending, to the mobile communications device, a data transmission symbol rate fv', a target communication quality value Q0', and a chip rate fc', which enable approval of communication; and causing the mobile communications device to newly determine and send, to the cell station, another data transmission symbol rate fv, another target communication quality value Q0, and another chip rate fc, on the basis of the mobile communications device a data transmission symbol rate fv', a target communication quality value Q0', and a chip rate fc'.

Further, in a case where the communication quality Q is inferior to the target communication quality value Q0, the step of monitoring the communication quality Q preferably involves an operation for sending a request to the cell station for increasing transmission power Pw and an operation for causing the cell station to update the chip rate fc in response to the request, to thereby increase the transmission power Pw, and the step of maintaining communication preferably involves an operation for updating of the plurality of communication parameters on the basis of the thus-updated chip rate fc and an operation for maintaining communication through use of the communication parameters.

In the mobile communications device, the communications system, and the communications method according to the present invention, the mobile communications device can set the spreading (despreading) chip rate fc. Therefore, the spreading (despreading) chip rate fc is set to be low, thereby enabling broadening of the width of a phase during which a correlation output P is produced. The unit of phase shift required for executing a sync-determination-and-maintaining operation (i.e., preparation of a delay profile) can be lengthened, so that the number of mathematical calculations (i.e., the amount of computation) and the amount of information (i.e., storage capacity) can be diminished.

At the time of the sync-determination-and-maintaining operation, a parallel correlator called a matched filter is in operation, and the power consumed by the matched filter accounts for the majority of the power consumption of a mobile station(i.e., a mobile communications device), such as a cellular phone. Therefore, so long as the width of a phase during which a correlation output P is produced is broadened by means of reducing the spreading (despreading) chip rate fc, a correlation can be detected even if the unit of phase shift corresponding to the period of an operation clock of the matched filter is broadened. Thus, the power consumed by the matched filter; that is, the power consumed by the mobile communications device, can be diminished.

Since a time interval during which a received signal is out of phase with the spreading code becomes longer by means of reducing the spreading (despreading) chip rate fc, the time interval during which a sync-determination-and-maintaining operation is performed can be made longer, thereby reducing the number of times the matched filter is activated per unit time.

The transmission power becomes higher in order to prevent deterioration of communication quality, which would otherwise be caused when the spreading (despreading) chip rate fc is reduced, thereby occupying a large amount of radio resources and reducing the number of available calls. For this reason, the amount of a bill is determined on the basis of the spreading (despreading) chip rate fc. As a result, a payment higher than an ordinary rate is charged to a person who desires enhanced convenience, thereby redressing an inequity between users and flexible, equitable, and rational management of a communications system.

In the mobile communications device, the communications system, and the communications method according to the present invention, the period Td at which a delay profile is prepared can be controlled in accordance with the period T at which synchronization between chips is lost and which corresponds to the traveling speed of the mobile communications device, thereby enabling preparation of a delay profile at an optimum period Td. Therefore, the number of mathematical calculations (i.e., the amount of computation) and the amount of information (i.e., storage capacity) can be reduced. Particularly, when the mobile communications device is stationary or travels at low speed, an operation for preparing an undesired delay profile can be omitted.

Further, the range of phase Tp during which a correlation output P is produced can be controlled by means of setting the spreading (despreading) chip rate fc. Therefore, when the period T during which synchronization between chips is lost is short, the spreading (despreading) chip rate fc is set to be low, thereby prolonging the period Td at which a delay profile is prepared. For this reason, the number of times a delay profile is prepared per unit time can be diminished, thus alleviating processing load. Further, the number of times a matched filter is operated per unit time is also reduced, thus diminishing power consumption.

With regard to the spreading (despreading) chip rate fc and the period Td at which a delay profile is prepared, the period Td can be determined on the basis of the spreading (despreading) chip rate fc, or the spreading (despreading) fc can be determined on the basis of the period Td. Consequently, communication can be established according to the state of the user, thus enabling flexible, equitable, and rational management of a communications system.

Even in the case of spread-spectrum communication in which the spreading (despreading) chip rate Fc of a mobile station is fixed, a mobile communications device (i.e., the mobile station) can select a different second receiving chip rate fc by means of a latch section provided in the sync-detection-and-maintaining section, thus achieving the advantages as discussed above.

DETAILED DESCRIPTION OF THE PREFERRED EMBODIMENTS

First Embodiment

A mobile communications device, a communications system, and a communications method according to a first embodiment of the present invention will be described hereinbelow in detail by reference to the accompanying drawings. The present invention is applied to a spread-spectrum communications technique, and more particularly, to a code division multiple access (CDMA) communications technique.

Figure 1:
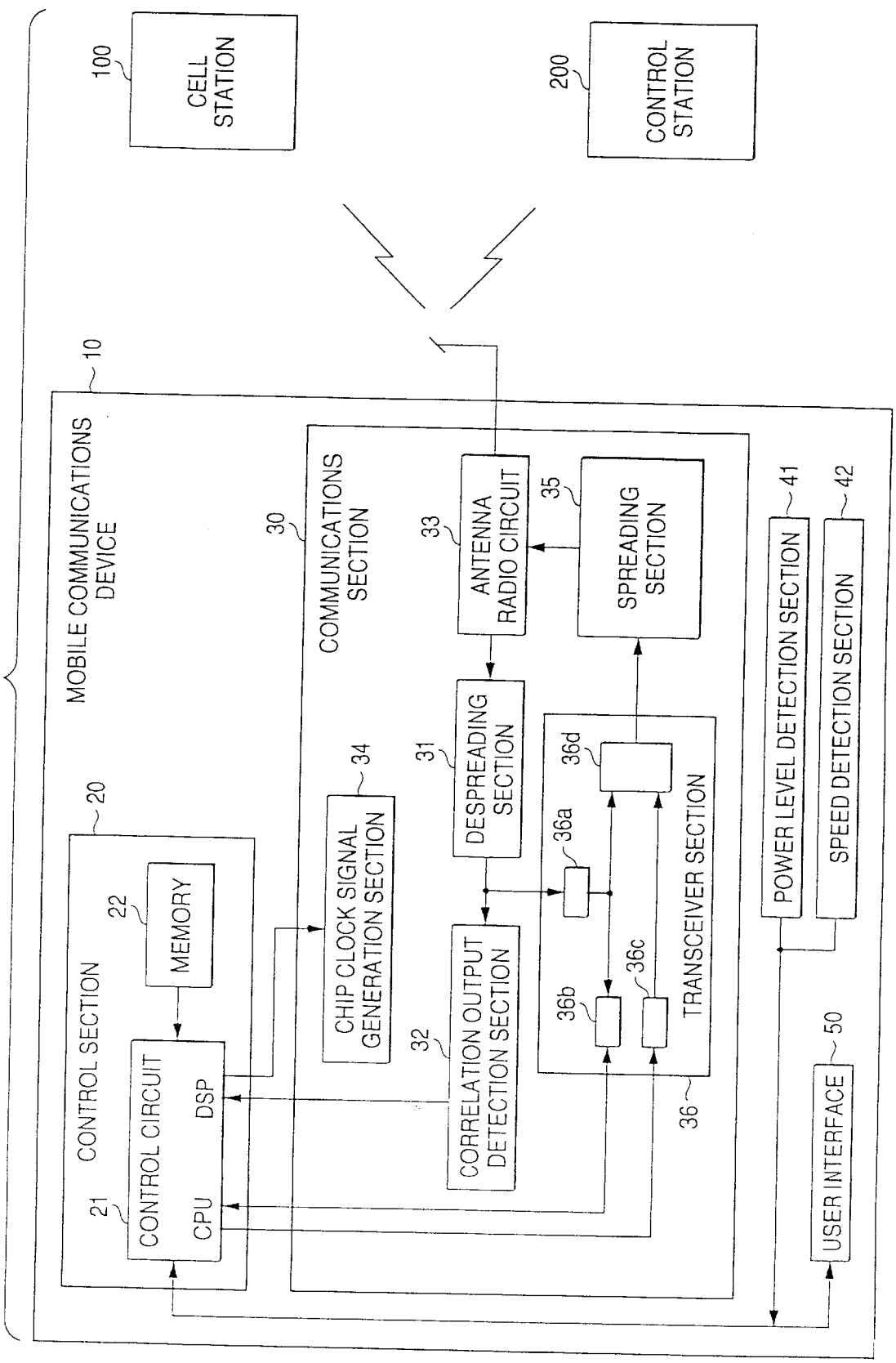
FIG. 1 is a block diagram showing an example configuration of a communications system according to a first example of the present invention.

FIG. 1 is a schematic diagram showing an example configuration of a communications system according to the present invention. The communications system comprises mobile communications devices 10, such as cellular phones; a cell station 100 for establishing communication with the plurality of mobile communications devices 10; and a control station 200 for performing a billing operation or a like operation.

The mobile communications device 10, such as a cellular phone, comprises a control section 20 for controlling communication; a communication section 30 for establishing data communication or like communication with a cell station; a power-level detection section 41 for detecting remaining power of, for example, a battery; a speed detection section 42 for detecting the traveling speed of the mobile communications device 10; and a user interface 50 which serves as a display or serves to indicate key entry performed by the user or a display.

The control section 20 of the mobile communications device 10 comprises a control circuit 21 which is equipped with a CPU (central processing unit) or a DSP (digital signal processor) and controls individual constituent sections provided within the mobile communications device 10; and memory 22 for storing a communication program and data. In the control section 20, the control circuit 21 controls individual constituent sections provided within the mobile communications device 10, according to a control program stored in the memory 22.

The communication section 30 comprises a chip clock signal generation section 34 for generating a chip clock signal fc (MHz) [hereinafter also called "spreading (or despreading)" chip rate]; an antenna radio circuit 33 which is equipped with a transmission section and a receiving section and transmits/receives data; a despreading section 31 for despreading a signal received by the antenna radio circuit 33, on the basis of the chip clock signal fc (MHz) signal output from the chip clock signal generation signal generation section 34; a correlation output detection section 32 for detecting a correlation output P from a signal despread by the despreading section 31; a transceiver section 36; and a spreading section 35 for spreading a signal to be transmitted, on the basis of a spreading code output from the transceiver section 36.

The transceiver section 36 of the mobile communications device 10 comprises a synchronous sample clock signal generation section 36a for multiplying, by a fixed factor, the chip clock signal fc (MHz) generated by the chip clock signal generation section 34; a sync-detection-and-maintaining section 36b for detecting the synchronization of the sample clock signal and maintaining the thus-detected synchronization (i.e., preparation of a delay profile); a carrier frequency modem 36c for modulating and demodulating the carrier frequency of communication; and a first spreading code generation section 36d for generating a spreading code.

The operation of the communications system according to the present invention will now be described by reference to FIGS. 1 through 3.

Figure 2:
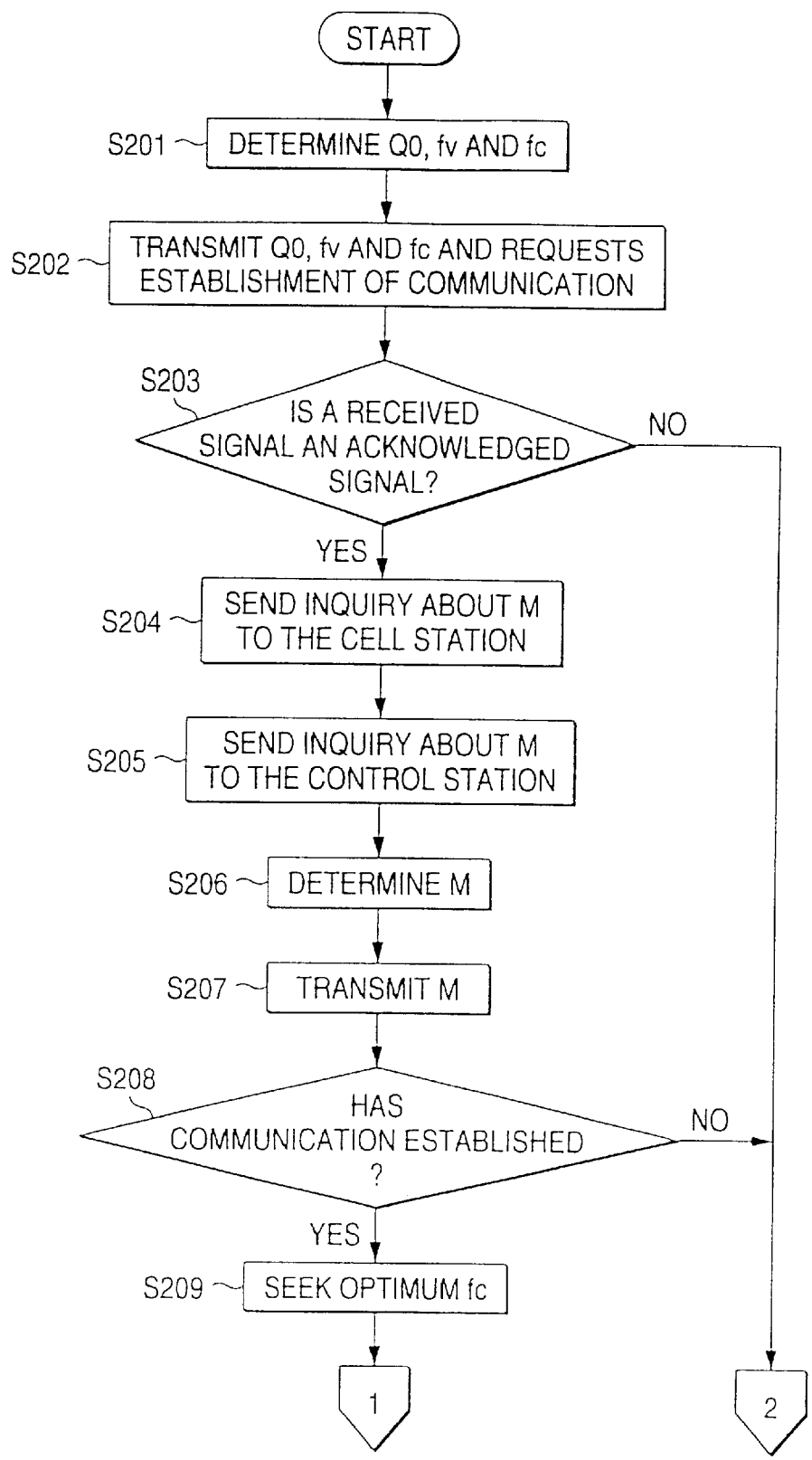
FIG. 2 is a flowchart describing the operation of the communications system according to the embodiment.
Figure 3:
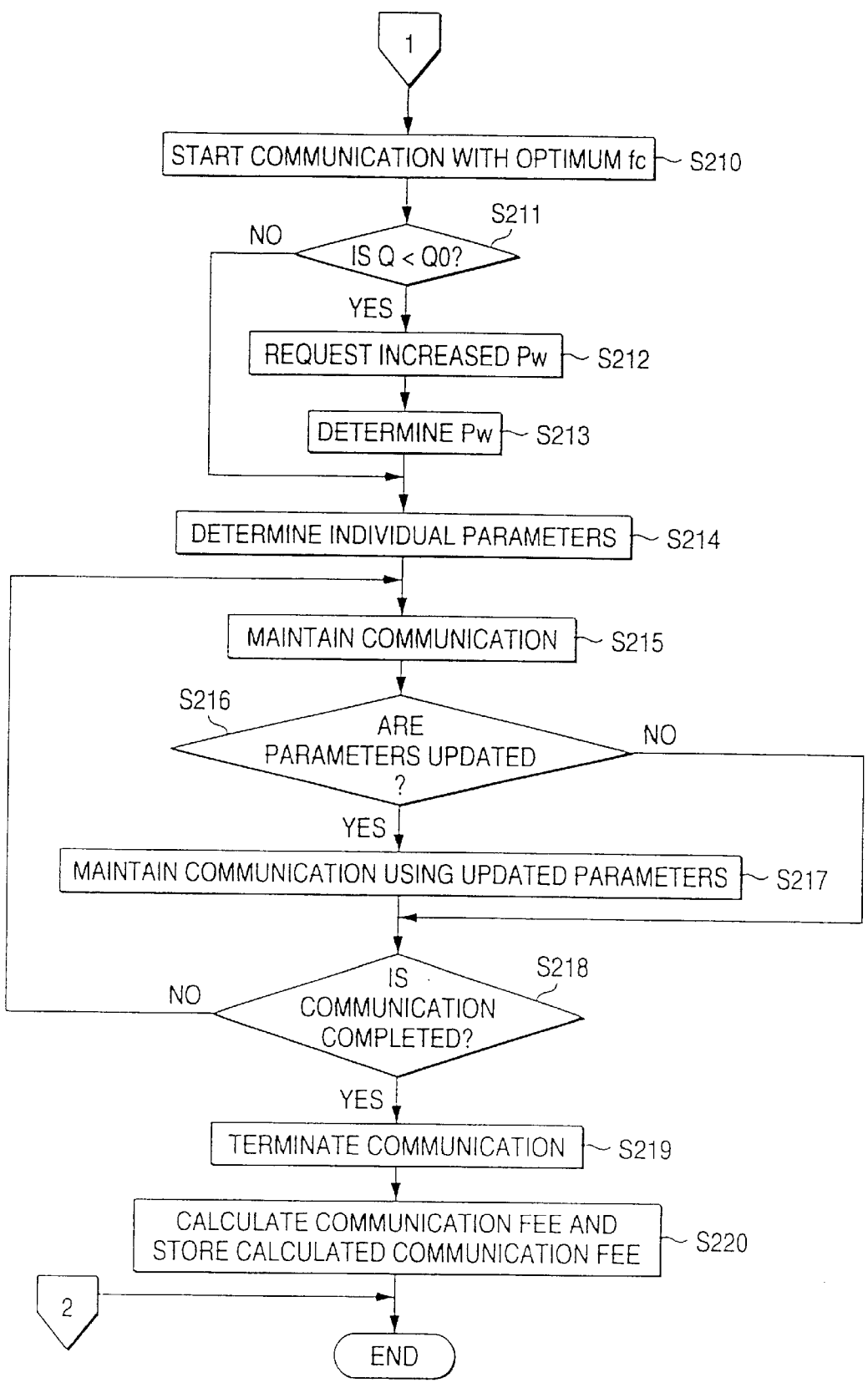
FIG. 3 is a flowchart describing the operation of the communications system according to the embodiment.

FIGS. 2 and 3 are flow charts showing the operation of the communications system. The control circuit 21 of the mobile communications device 10 determines a target figure Q0 of communication quality Q, a data transmission symbol rate fv (MHz), and a spreading (or despreading) chip rate fc (MHz), which are transmitted to a called station 10 (another mobile communications device) and the cell station 100, and sends a request to the cell station 100 for establishing communication (S201).

The target value Q0 of communication quality can be determined as follows:

(1) Determination of the target value Q0 in accordance with an input entered by way of the user interface 50

A value, which has been entered through the user's key operation, is received by the control circuit 21 by way of the user interface 50. The target value Q0 of communication quality is determined by way of the thus-received value.

(2) Determination of arbitrary communication quality Q

Here, as communication quality Q, there may be employed the "inverse of a bit error rate obtained after despreading of a received signal (1/BER)," a "ratio of a received signal which has been despread/thermal noise (SIR)," or a "ratio of signal energy per bit/noise energy density (Eb/N0)." At this time, a bit error rate (BER) may be taken as communication quality Q after having been converted into a ratio (SIR). On the basis of the thus-determined communication quality Q, a target value Q0 of communication quality is determined.

The data transmission symbol rate fv (MHz) can be determined as follows:

(1) Determination of the data transmission symbol rate fv in accordance with an input entered by way of the user interface 50.

A value, which has been entered through the user's key operation, is received by the control circuit 21 by way of the user interface 50. On the basis of the thus-input value, the data transmission symbol rate fv is determined.

(2) Determination of the data transmission symbol rate fv in accordance with a spreading (despreading) rate N and a spreading (despreading) chip rate fc On the basis of the spreading (despreading) rate N and the spreading rate (despreading) chip rate fc, which have been stored in the memory 22 in advance, the data transmission symbol rate fv is determined according to Equation 1 provided below.

$$fv=fc/N \quad (1)$$

The spreading (despreading) rate N and the spreading (despreading) chip rate fc may be determined in accordance with an input entered by way of the user interface 50.

The spreading (despreading) chip rate fc (MHz) can be determined as follows:

(1) Determination of the spreading (despreading) chip rate fc in accordance with an input entered by way of the user interface 50

The control circuit 21 receives the value entered by means of the user's key operation by way of the user interface 50 and determines the spreading (despreading) chip rate fc on the basis of the input value.

(2) Determination of a default value

The chip rate fc is determined on the basis of a default value which has been stored in the memory 22 in advance.

Any of the values mentioned above can be indicated in a display section (not shown) of the user interface 50.

The mobile communications device 10 sends the data transfer symbol rate fv (MHz), the target value Q0 of communication quality, and the spreading (despreading) chip rate fc (MHz) to the cell station 100 and requests the cell station 100 to establish communication (S202).

Upon receipt from the cell station 100 of an acknowledgement signal about establishment of communication (S203), the mobile communications device 10 sends the cell station 100 an inquiry about an hourly communication rate M (S204).

If the mobile communications device 10 has received, from the cell station 100, a disapproval signal with regard to establishment of communication (S203), communication will be terminated. Alternatively, the cell station 100 may send the mobile communications device 10, in lieu of a disapproval signal, a data transfer symbol rate fv' (MHz), a target value Q0' of communication quality, or a spreading (despreading) chip rate fc' (MHz), which corresponds to a value within an approvable range. The mobile communications device 10 reviews the value thus received from the cell station 100 and sends again to the cell station 100 the data transmission symbol rate fv (MHz), the target value Q0 of communication quality, and the spreading (despreading) chip rate fc (MHz), thus again requesting the cell station 100 to establish communication. With regard to review of those values, there may be employed a value which falls within a range of values—which can be selected by the mobile communications device 10—and is closest to the value transmitted from the cell station 100, or the value (e.g., an upper or lower limit) transmitted from the cell station 100.

The cell station 100 sends to the control station 200 an inquiry about a bill (i.e., the hourly communications rate M) which would be charged to the mobile communications device 10 (S205).

On the basis of the spreading (despreading) chip rate fc transmitted from the mobile communications device 10, the control station 200 determines the hourly communication rate M through use of a communication rate calculation section (not shown) (S206). Here, the communication rate M can be determined by Equation 2 provided below.

$$M=km/fc+\alpha$$

$$\therefore km \text{ is a constant such that } 0<km, \text{ and a is a constant such that } 0\leq\alpha \quad (2)$$

The communications rate M may be determined on the basis of hardware resources of the cell station 100 corresponding to the spreading (despreading) chip rate fc; for example, the number of spreading codes to be used or interference power attributable to transmission power. Accordingly, the cell station 100 can use a different spreading (despreading) chip rate fc suitable for the mobile communications device 10 which establishes communication.

If no consideration is given to maintenance of communication quality, Equation 2 may be modified to "M=km× fc+α," thus determining the communication rate M. The cell station 100 may be arranged so as to determine radio resources, such as transmission power, in preference to hardware resources, such as storage capacity or the activity ratio of a CPU.

The cell station 100 transmits to the mobile communications device 10 the communication rate M determined by the control section 200 (S207).

The mobile communications device 10 prompts the user for a decision, by means of indication of the communication rate M by way of the user interface 50, or determines whether to establish communication by means of automatically evaluating the communication rate M (S208). If the user cannot afford to pay the communication rate M, communication will be terminated.

In a case where establishment of communication is determined, the control circuit 21 of the mobile communications device 10 seeks an optimum spreading (despreading) chip rate fc (MHz) (S209). The spreading (despreading) chip rate fc (MHz) can be determined as follows.

(1) Determination of a target value W (mW) of the power consumed by the mobile communications device 10

On the basis of the target value W of the power consumed by a BB (begin bracket) processing circuit or a transmission circuit of the mobile communications device 10, or on the basis of the target value W of the power consumed by the entirety of the mobile communications device 10, a spreading (despreading) chip rate fc is determined according to Equation 3 provided below.

$$W=a*fc+b$$

$$\therefore fc=(W-b)/a$$

∵ a is a predetermined value satisfying 0<a, and (3)

b is a predetermined value satisfying 0<b.

The target power consumption value W can be determined beforehand, or a value entered by the user by way of the user interface 50 may be taken as the target power consumption value W. Alternatively, the target power consumption value W may be determined by Equation 4 provided below, on the basis of a power level E (mW·s) output from the power level detection section 41 and a call-await time or communication time t(s) of the mobile communications device 10.

$$W=E/t \quad (4).$$

A predetermined value or a value entered by way of the user interface 50 may be taken as the call-await time or communication time t(s) of the mobile communications device 10. Alternatively, a mode, such as a long-hour operation mode or a short-hour operation mode, may be displayed by means of the user interface 50, to thereby assist the user in determining a call-await time or communication time "t." At this time, on the basis of the mode entered by way of the user interface 50, the control circuit 21 determines a call-await time or communication time "t".

Further, in a case where actual communication is established not at the optimum spreading (despreading) chip rate fc (MHz) but with another spreading (despreading) chip rate fc' (MHz) (fc'≠fc) and where the communication requires a communication time t' differing from the time "t" specified by the user, a message to that effect may be reported to the user by way of the user interface 50.

In Equation 3, a target electrical current consumption value I (mA) may be employed instead of the target power consumption value W (mW).

(2) Determination of the spreading (despreading) chip rate fc on the basis of a target value W0 (mW) of the power consumed by the mobile communications device 10.

The spreading (despreading) chip rate fc is determined according to Equation 5 provided below, on the basis of the target value W0 of the power consumed during the call-await time of the mobile communications device 10 (i.e., the power consumed by the BB processing circuit). The target value W0 of the power consumed during the call-await time can be determined on the basis of the information supplied from the power level detection section 41.

$$W0=a0*fc+b0$$

$$\therefore fc=(W0-b0)/a0$$

∵ a is a predetermined value satisfying 0<a0, and (5)

b is a predetermined value satisfying 0<b0.

Here, the target value W0 of the power consumed during the call-await time is determined according to Equation 6 provided below, on the basis of a power level (mW·s) output from the power level detection section 41 as well as a target call-await time t(s) of the mobile communications device 10.

$$W0=E/t \quad (6)$$

A predetermined value or a value entered by way of the user interface 50 may be taken as a target call-await time t(s) of the mobile communications device 10. Alternatively, a mode, such as a long-hour operation mode or a short-hour operation mode, may be displayed by means of the user interface 50, to thereby assist the user in determining a target call-await time "t." At this time, on the basis of the mode entered by way of the user interface 50, the control circuit 21 determines a target call-await time "t."

The target value W0 of the power consumed during a call-await time may be updated at the initiation of a call-await time of the mobile communications device 10 or during communication.

Further, in a case where actual communication is established not at the optimum spreading (despreading) chip rate fc (MHz) but another spreading (despreading) chip rate fc' (MHz)(fc'≠fc) or in a case where the communication requires a communication time t' differing from the time "t" specified by the user, a message to that effect may be reported to the user by way of the user interface 50.

In Equation 5, a target electric current consumption value I0 (mA) may be employed instead of the target power consumption value W0 (mW).

(3) Determination of the spreading (despreading) chip rate fc on the basis of a target value W1 (mW) of the power consumed by the mobile communications device 10 during communication The spreading (despreading) chip rate fc is determined according to Equation 7 provided below, on the basis of the target value W1 of the power consumed by the mobile communications device during communication (i.e., the power consumed by the transmission circuit). The target value W1 of the power consumed during communication can be determined on the basis of the information supplied from the power level detection section 41.

$$W1=a1*fc+b1$$

$$\therefore fc=(W-b1)/a1 \quad (7)$$

∵ a1 is a predetermined value, and b1 is a predetermined value.

Here, the target value W1 of the power consumed during communication is determined according to Equation 8 provided below, on the basis of a power level (mW·s) output from the power level detection section 41 as well as a target communication time t(s) of the mobile communications device 10.

$$W1=E/t \quad (8)$$

A predetermined value or a value entered by way of the user interface 50 may be taken as a target communication time t(s) of the mobile communications device 10. Alternatively, a mode, such as a long-hour operation mode or a short-hour operation mode, may be displayed by means of the user interface 50, to thereby assist the user in determining a target the communication time "t." At this time, on the basis of the mode entered by way of the user interface 50, the control circuit 21 determines a target communication time "t." Further, the control circuit 21 may set an actual available time (a period of time during which communication is available) as the target communication time "t." Alternatively, a communication termination time may be set, and a communicable time determined by reverse counting from the communication termination time may be set as a target communication time "t."

The target value W1 of the power consumed during communication may be updated at the initiation of a call-await time of the mobile communications device 10 or during communication.

Further, in a case where actual communication is established not at the optimum spreading (despreading) chip rate fc (MHz) but at another spreading (despreading) chip rate fc' (MHz) (fc'1≠fc) or in a case where the communication requires a communication time t' differing from the time "t"

specified by the user, a message to that effect may be reported to the user by way of the user interface 50.

In Equation 7, a target electrical current consumption value I1 (mA) may be employed instead of the target power consumption value W1 (mW).

(4) Determination of the spreading (despreading) chip rate fc on the basis of a time T(s) during which a receiving path of a received signal is out of phase with the spreading code The spreading (despreading) chip rate fc is determined, according to Equation 9 provided below, on the basis of the time T during which a receiving path of a received signal is out of phase with the spreading code.

$$fc=kc/T$$

∵ kc is a predetermined value (9)

Here, the spreading (despreading) chip rate fc is determined such that the time T during which a receiving path of a received signal is out of phase with the spreading code falls within the range of predetermined target value T0. For example, in the case of T<T0, the spreading (despreading) chip rate fc is determined so as to be low [i.e., a period Tc (s) of a spreading (despreading) code becomes long]. In the case of T>T0, the spreading (despreading) chip rate fc is set to be high [i.e., a period Tc (s) of a spreading (despreading) code becomes short].

In a case where the predetermined target value T0 falls within a range of T1≦T0≦T2 [T1(s) and T2(s) are predetermined values]; for example, in the case of T<T1, the spreading (despreading) chip rate fc can be set to be lower [i.e., the period Tc(s) of the spreading (despreading) code becomes long]. In the case of T>T2, the spreading (despreading) chip rate fc can be set to be higher [i.e., the period Tc(s) of the spreading (despreading) chip rate fc becomes high].

The minimum value T1 (i.e., the shortest period of time) of time T during which a receiving path of a received signal is out of phase with the spreading code can be determined according to Equation 10 provided below, on the basis of data V pertaining to the traveling speed of the mobile communications device 10 [hereinafter referred to as "traveling speed data V (m/s)"] and the wavelength λc (m) of a wave (i.e., a spreading code) of the chip rate fc.

$$T1=\lambda kc/V.$$

A speed detected by the speed detection section 42 or the predetermined maximum traveling speed of the mobile communications device 10 may be taken as traveling speed data V (m/s) pertaining to the mobile communications device 10. Alternatively, the traveling speed data V (m/s) may be determined by the user by way of the user interface 50.

(5) Determination of the spreading (despreading) chip rate fc on the basis of a period Td (s) at which a delay profile is prepared by the sync-detection-and-maintaining section 36*b*

The spreading (despreading) chip rate fc is determined according to Equation 11 provided below, on the basis of a period Td at which a delay profile is prepared by the sync-detection-and-maintaining section 36*b*.

$$fc=kd/Td$$

∵ kd is a predetermined value satisfying 0<kd (11)

The period Td at which a delay profile is prepared can be determined according to Equation 12, on the basis of the time T(s) during which a receiving path of a received signal is out of phase with the spreading code.

$$Td=ke*T$$

∵ ke is a predetermined value satisfying 0<ke<1 (12)

(6) Determination of the spreading (despreading) chip rate fc on the basis of a spreading (despreading) rate N and a data transmission symbol rate fv The spreading (despreading) chip rate fc is determined according to Equation 13 provided below, on the basis of the spreading (despreading) rate N and the data transmission symbol rate fv, which have been stored in the memory 22 in advance.

$$fc=fv/N$$  (13)

Here, the spreading (despreading) rate N and the data transfer symbol rate fv may be determined by means of an input entered by way of the user interface 50. The data transmission symbol rate fv maybe determined through the fore going processing.

(7) Determination of the spreading (despreading) chip rate fc on the basis of a communication rate M A communication rate M is set by way of the user interface 50, and the spreading (despreading) chip rate fc is determined according to Equation 14 provided below, on the basis of the communication rate M.

$$fc=km/M-\alpha$$

∵ km is a predetermined value satisfying 0<km, and

α is a predetermined value satisfying 0≦αα (14)

(8) Determination of the spreading (despreading) chip rate fc on the basis of the amount of memory required (Me)

In a case where a delay profile to be described later is prepared, a synchronous sample rate fs (MHz) at which a delay profile is prepared can be determined, on the basis of the amount of memory (ME) required for storing a delay profile. Further, a spreading (despreading) chip rate fc can be determined on the basis of the synchronous sample rate fs. Consequently, on the basis of the amount of memory required (Me), the spreading (despreading) chip rate fc can be determined.

(9) Determination of the spreading (despreading) chip rate fc on the basis of the amount of computation (Mi) required for maintaining synchronization (i.e., preparation of a delay profile)

Asynchronous sample rate fs (MHz) at which a delay profile is prepared can be determined, on the basis of the amount of computation (Mi) required for preparing a delay profile (e.g., the activity ratio of a CPU). Further, the spreading (despreading) chip rate fc can be determined on the basis of the synchronous sample rate fs. Consequently, the spreading (despreading) chip rate fc can be determined on the basis of the amount of computation (Mi).

As mentioned above, the control circuit 21 of the mobile communications device 10 can determine the optimum spreading (despreading) chip rate fc (MHz) in accordance with the state of communication. For example, the spreading (despreading) chip rate fc may be determined so as to reduce the amount of hardware resources to be used, such as power consumption, W, W0, or W1; the amount of memory used (Me), or the amount of computation (Mi); or to reduce the communications rate M. Alternatively, the spreading (despreading) chip rate fc may be determined so as to lengthen the period Td at which a delay profile is prepared as well as to reduce the amount of radio resources occupied.

On the basis of the thus-determined spreading (despreading) chip rate fc, individual factors are despread through use of corresponding Equations, thus reporting the despreading results to the user by way of the user interface 50. More specifically, at this time, the spreading (despreading) chip rate fc, the communication rate M charged during communication, the amount of occupation of radio resources, and the amount of occupation of hardware resources may be submitted to the user interface 50, so that the user may re-determine the spreading (despreading) chip rate fc by means of user's selection.

Communication is commenced at the thus-obtained spreading (despreading) chip rate fc (S210). More specifically, the spreading (despreading) chip rate fc can be determined by the mobile communications device 10 (mobile station). Therefore, the cell station 100 sets a spreading (despreading) chip rate fc for each mobile communications device (or each mobile station).

Contingent on approval by the cell station 100, the thus-obtained optimum spreading (despreading) chip rate fc (MHz) enables establishment of communication when transmitted to the cell station 100. At this time, communication may be actually established not with the spreading (despreading) chip rate fc' (MHz) (fc'≠fc) controlled by the cell station 100, but with the thus-obtained optimum spreading (despreading) chip rate fc (MHz)

During communication, the control section 20 monitors whether or not the quality Q of the communication is deteriorated, as compared with the target communication quality value Q0 (S211). In a case where the quality Q of communication is indicated by SIR or Eb/N0, the quality of communication can be monitored as follows.

When communication is started, a spreading (despreading) rate N1 which serves as a reference is initialized and set to a predetermined value Nf. The current spreading (despreading) rate N is determined according to Equation 15 provided below, on the basis of the spreading (despreading) chip rate fc employed for current communication and the data transfer symbol rate fc.

$$N=fv/fc \quad (15)$$

The spreading (despreading) rate N is stored in the memory 22 as the spreading (despreading) rate Ni which serves as a reference for subsequent communication.

The communication quality Q is determined according to Equation 16 provided below.

$$Q=N/kq$$

∵kq is a predetermined value satisfying 0<kq, and the unit of kq is dependent on the unit of Q. (16)

Next, monitoring is performed with regard to whether or not the communication quality Q is deteriorated when compared with the target communication quality value Q0 (=Nf/kq), by means of comparison between the communication quality Q and the target communication quality value Q0.

If in the course of communication a change arises in either the spreading (despreading) chip rate fc or the data transfer symbol rate fv, preferably the communication quality Q is re-calculated and compared with the target communication quality value Q0 or a communication quality Q1 (=N1/kq) calculated from the spreading (despreading) rate N1 stored in the memory 22.

If in step S211 the communication quality Q is determined to be deteriorated when compared with the target value Q0 (or Q1), the deteriorated can be compensated for by an increase in the power Pw (mW) transmitted from the cell station 100. Consequently, the mobile communications device 10 sends a request to the cell station 100 for increasing the transmission power Pw (S212). At this time, deterioration of the communication quality Q is preferably reported to the user by way of the user interface 50.

In the cell station 100, a transmission power calculation section (not shown) determines the transmission power Pw according to Equation 17 provided below, thus maintaining the communication quality Q at the target value Q0 or more (S213).

$$P=kp/fc+\beta$$

∵kp(kW/s) is a predetermined value satisfying 0<kp, and (17)

β(mW) is a predetermined value.

Here, kp (kW/s) and β(mW) can be determined in accordance with the state of communication, as required. Even when the user decreases the spreading (despreading) chip rate fc, the communication quality Q is deteriorated. Even in such a case, the deterioration of the communication quality Q can be compensated for by an increase in the power Pw (mW) transmitted from the cell station 100.

Individual parameters required at the time of execution of a sync-detection-and-maintaining operation (i.e., preparation of a delay profile) are determined (S214). The parameters include a sample rate fs (MHz) [having a period ts (s)], the period Td (s) at which a delay profile is prepared, the amount of memory used Me, and the amount of computation Mi.

The sample rate fs (MHz) required at the time of preparation of a delay profile can be determined according to Equation 18 provided below, on the basis of the spreading (despreading) chip rate fc.

$$fs=ks*fc$$

∵ks is a predetermined value satisfying 1<ks. (18)

The period Td (s) at which a delay profile is prepared can be determined according to Equation 19 provided below, on the basis of the time T (s) during which a receiving path of a received signal is out of phase with the spreading code.

$$Td=ke*T$$

∵ke is a predetermined value satisfying 0<ke <1. (19)

At this time, the receiving path of the received signal is preferably limited to the principal wave. The minimum time T min (the shortest period of time) of time T during which the receiving path of the received signal is out of phase with the spreading code can be determined according to Equation 10, on the basis of the traveling speed data V (m/s) pertaining to the mobile communications device 10 and the wavelength λc (m) of the wave (spreading code) of the spreading (despreading) chip rate fc. The traveling speed data V (m/s) pertaining to the mobile communications device 10 provided in Equation 10 may correspond to the speed detected by the speed detection section 42 or the predetermined maximum traveling speed of the mobile communications device 10. Alternatively, the traveling speed may be determined by the user and input by way of the user interface.

Further, the period Td (s) at which a delay profile is prepared can also be determined according to Equation 20, on the basis of the spreading (despreading) chip rate fc.

$$Td=kd/fc$$

∵kd is a predetermined value satisfying 0<kd. (20)

The amount of memory used Me and the amount of computation Mi can be defined as a function such as that expressed by Equation 21.

Me=Fme (fs)

Mi=Fmi (fs)

Fme (fs) represents a function of the amount of memory used Me and a sample rate fs required for preparation of a delay profile, and Fmi (fs) represents a function of the amount of computation Mi and the sample rate fs.

Conversely, the sample rate fs required for preparation of a delay profile can be determined on the basis of the amount of memory used Me, according to Equation 22 provided below. Similarly, the sample rate fs can be determined on the basis of the amount of computation Mi, according to Equation 22.

fs=Fme'(Me)

fs=Fmi'(Mi)  (22)

The Fme'(Me) corresponds to an inverse of the function of Fme (fs), and the Fmi'(Mi) corresponds to an inverse of the function of Fmi(fs).

A sync-determination-and-maintaining operation (i.e., preparation of a delay profile) is determined through use of the thus-obtained respective parameters, thus maintaining the state of communication (S215). At this time, the two sample rates fs determined according to Equation 22 are compared with each other, and the smaller of the two sample rates fs may be selected.

In a case where in the course of communication the individual parameters are updated at the time of execution of the sync-determination-and-maintaining operation (S216), the sync-determination-and-maintaining operation (i.e., preparation of a delay profile) is performed through use of the thus-updated parameters, thereby maintaining communication (S217).

In a case where communication is terminated (S218), the mobile communications device 10 terminates communication (S219). In order to terminate communication, the mobile communications device 10 terminates the channel assigned thereto and sends a request to a called (or calling) party for terminating the channel, by way of the cell station 100. Further, the mobile communications device 10 enters a communication-terminated state, in which the spreading (despreading) chip rate fc is initialized with a default value (i.e., a predetermined value) and the data transfer symbol rate fv is set to 0.

On the basis of the time from initiation of communication to termination of communication and the hourly communication rate M, the control station 200 calculates a communication fee and stores the thus-calculated fee (S220).

In the mobile communications device, the communications system, and the communications method according to the present invention, the mobile communications device can set the spreading (despreading) chip rate fc. Therefore, the spreading (despreading) chip rate fc is set to be low, thereby enabling broadening of the width of a phase during which a correlation output P is produced. The unit of phase shift required for executing a sync-determination-and-maintaining operation (i.e., preparation of a delay profile) can be lengthened, so that the number of mathematical calculations (i.e., the amount of computation) and the amount of information (i.e., storage capacity) can be diminished.

At the time of the sync-determination-and-maintaining operation, a parallel correlator called a matched filter is in operation, and the power consumed by the matched filter accounts for the majority of the power consumption of a mobile station (i.e., a mobile communications device), such as a cellular phone. Therefore, so long as the width of a phase during which a correlation output P is produced is broadened by means of reducing the spreading (despreading) chip rate fc, a correlation can be detected even if the unit of phase shift corresponding to the period of an operation clock of the matched filter is broadened. Thus, the power consumed by the matched filter; that is, the power consumed by the mobile communications device, can be diminished.

Since a time interval during which a received signal is out of phase with the spreading code becomes longer by means of reducing the spreading (despreading) chip rate fc, the time interval during which a sync-determination-and-maintaining operation is performed can be made longer, thereby reducing the number of times the matched filter is activated per unit time.

The transmission power becomes higher in order to prevent deterioration of communication quality, which would otherwise be caused when the spreading (despreading) chip rate fc is reduced, thereby occupying a large amount of radio resources and reducing the number of available calls. For this reason, the amount of a bill is determined on the basis of the spreading (despreading) chip rate fc. As a result, a payment higher than an ordinary rate is charged to a person who desires enhanced convenience, thereby redressing an inequity between users and flexible, equitable, and rational management of a communications system.

In the mobile communications device, the communications system, and the communications method according to the present invention, the period Td at which a delay profile is prepared can be controlled in accordance with the period T at which synchronization between chips is lost and which corresponds to the traveling speed of the mobile communications device, thereby enabling preparation of a delay profile at an optimum period Td. Therefore, the number of mathematical calculations (i.e., the amount of computation) and the amount of information (i.e., storage capacity) can be reduced. Particularly, when the mobile communications device is stationary or travels at low speed, an operation for preparing an undesired delay profile can be omitted.

Further, the range of phase Tp during which a correlation output P is produced can be controlled by means of setting the spreading (despreading) chip rate fc. Therefore, when the period T during which synchronization between chips is lost is short, the spreading (despreading) chip rate fc is set to be low, thereby prolonging the period Td at which a delay profile is prepared. For this reason, the number of times a delay profile is prepared per unit time can be diminished, thus alleviating processing load. Further, the number of times a matched filter is operated per unit time is also reduced, thus diminishing power consumption.

With regard to the spreading (despreading) chip rate fc and the period Td at which a delay profile is prepared, the period Td can be determined on the basis of the spreading (despreading) chip rate fc, or the spreading (despreading) fc can be determined on the basis of the period Td. Consequently, communication can be established according to the state of the user, thus enabling flexible, equitable, and rational management of a communications system.

Second Embodiment

There will now be described spread-spectrum communication in which a spreading (despreading) chip rate fc of a mobile station is fixed for each communication; for example, a common CDMA communications system.

Figure 4:
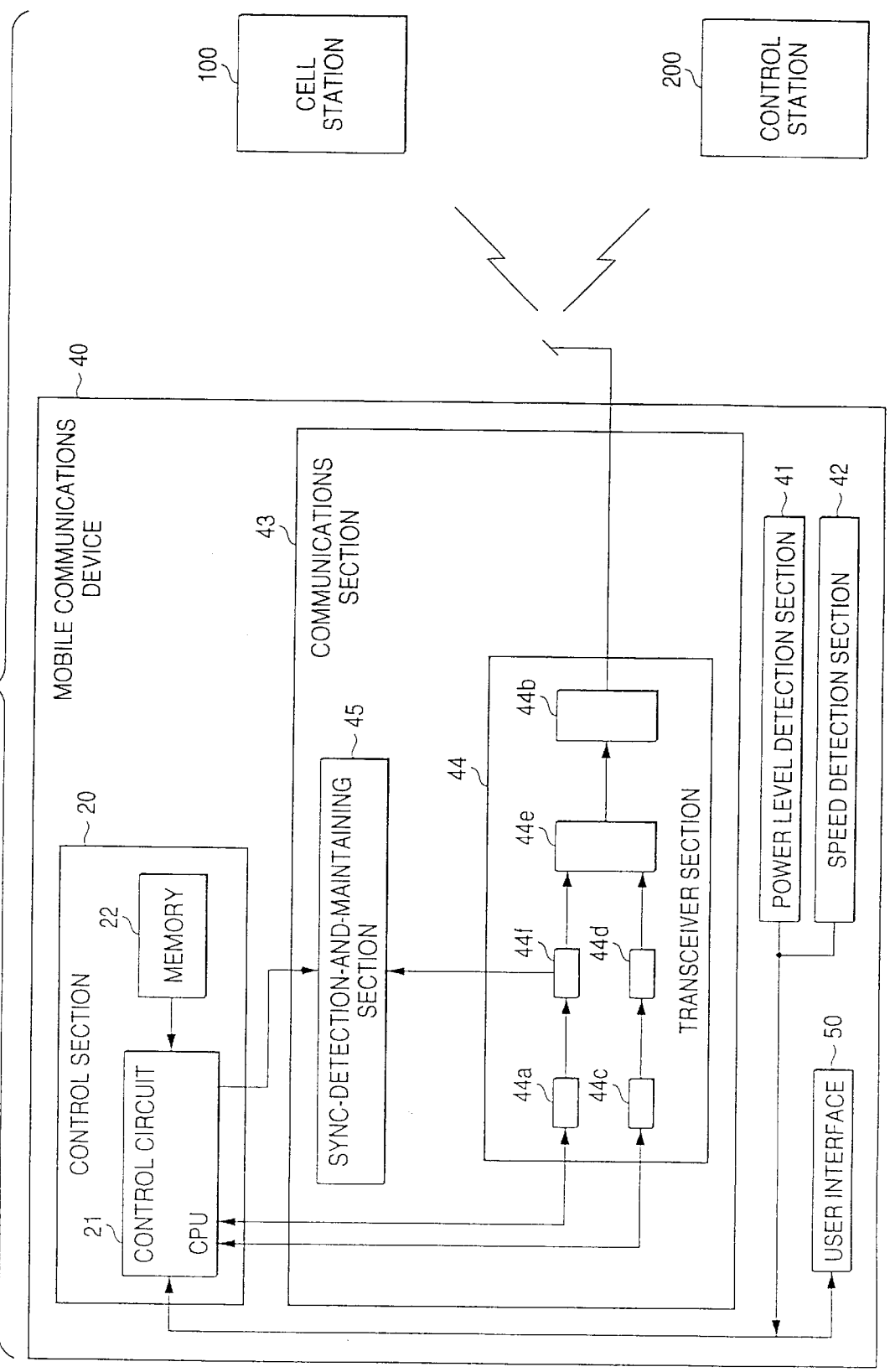
FIG. 4 is a block diagram showing an example configuration of a communications system according to a second embodiment of the present invention.

FIG. 4 is a schematic diagram showing an example configuration of a communications system according to a second embodiment of the present invention. The communications system comprises mobile communications devices 40, such as cellular phones, a cell station 100 for establishing communication with the plurality of mobile communications devices 40, and a control station 200 for performing a billing operation or a like operation.

The mobile communications device 40, such as a cellular phone, comprises a control section 20 for controlling communication; a communication section 43 for establishing data communication or like communication with a cell station; a power-level detection section 41 for detecting remaining power of, for example, a battery; a speed detection section 42 for detecting the traveling speed of the mobile communications device 10; and a user interface 50 serving to indicate key entry performed by the user or serving as a display.

The control section 20 of the mobile communications device 40 comprises a control circuit 21 which is equipped with a CPU (central processing unit) or a DSP (digital signal processor) and controls individual constituent sections provided within the mobile communications device 40; and memory 22 for storing a communication program and data. In the control section 20, the control circuit 21 controls individual constituent sections provided within the mobile communications device 40, according to a control program stored in the memory 22.

The communication section 43 comprises a transceiver section 44 for establishing data communication, and a sync-detection-and-maintaining section 45 for preparing a delay profile. The transceiver section 44 comprises a first chip clock signal generation section 44a for generating a first chip clock signal Fc (MHz); an antenna radio circuit 44b which is equipped with an antenna, a transmission section, and a receiving section and which transmits/receives data; a carrier frequency modem section 44c for modulating/demodulating a carrier frequency of communication; a first spreading code generation section 44d for generating a spreading code; a spreading section 44e for spreading a transmission signal in accordance with the spreading code generated by the first spreading code generation section 44d; and a synchronous sample clock signal generation section 44f for multiplying, by a fixed factor, the first chip clock signal Fc (MHz) generated by the first chip clock signal generation section 44a.

Figure 5:
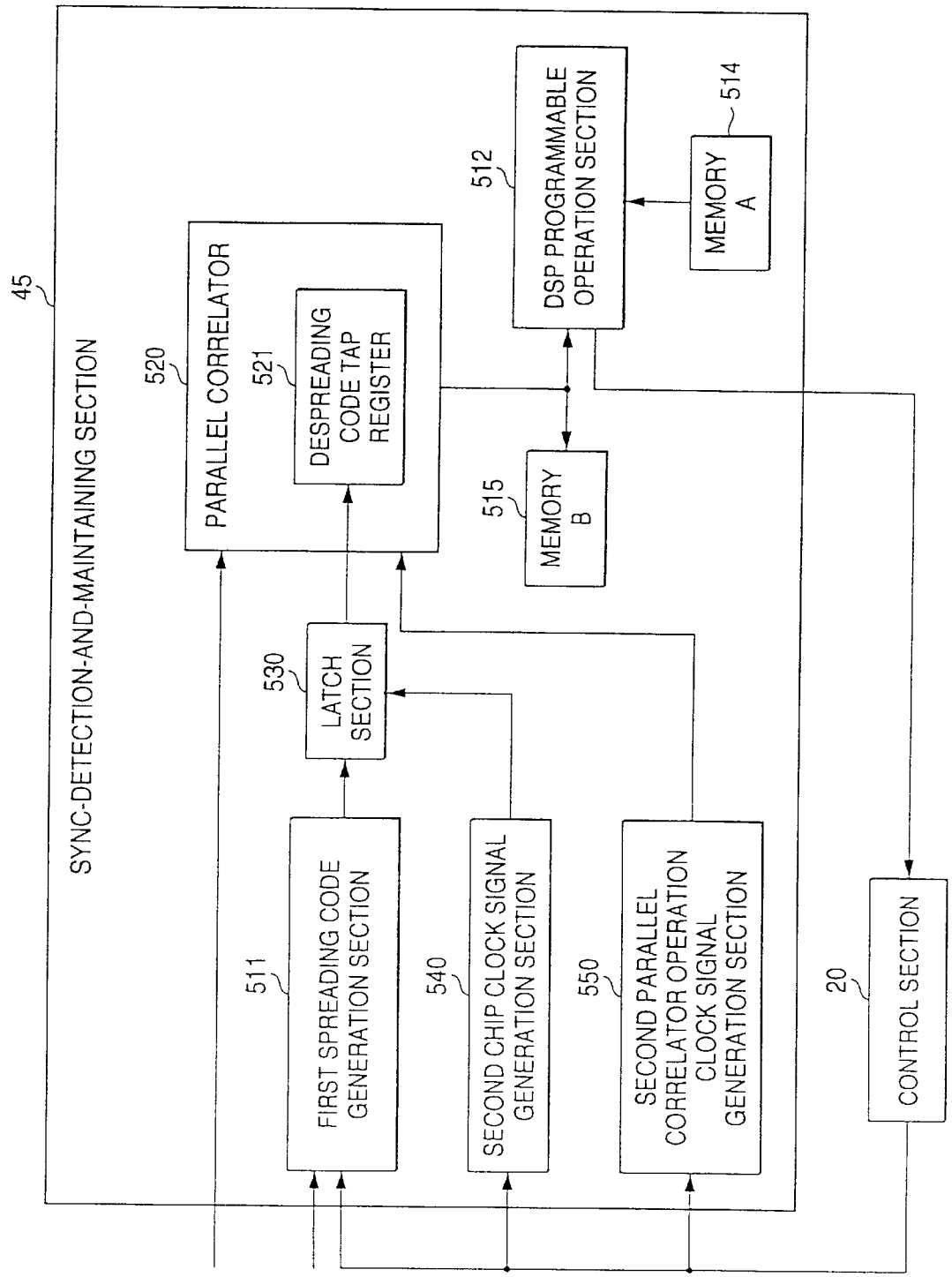
FIG. 5 is a block diagram showing the configuration of a sync-detection-and-maintaining section 45.

FIG. 5 is a block diagram showing the configuration of a sync-determination-and-maintaining section 45. In FIG. 5, the sync-determination-and-maintaining section 45 comprises a first despreading code generation section 511 for generating a first despreading code C on the basis of a first chip clock Fc (MHz) signal generated by the first chip clock signal generation section and despreading information output from the control section 20; a second chip clock signal generations section 540 for generating a second chip clock signal fc (MHz) (hereinafter referred to also as "despreading chip rate") on the basis of a clock signal output from the control section 20; a second parallel correlator operation clock signal generation section 550 for generating a second operation clock signal fs (MHz) of a parallel correlator 5to be described later, on the basis of the clock signal Fs (MHz) output from the control section 20; a latch section 530 for generating a second despreading code C' by means of latching the first despreading code C output from the first despreading code generation section 511; a parallel correlator 520 which is provided with a despreading code tap register 521 for temporarily storing the second despreading code C' output from the latch section 530 and which outputs a correlation output P through use of a signal S received by the transceiver section 44, on the basis of the second despreading code C' and the second operation clock signal fs output from the second parallel correlator operation clock signal generation section 550; memory B 515 for storing the correlation output p output from the parallel correlator 520; and a DSP programmable operation section 512 which operates in accordance with a control program output from the memory A 514 and prepares a delay profile on the basis of the correlation output P stored in the memory B 515.

As mentioned above, the principal difference between the communications system shown in FIGS. 4 and 5 and the communications system shown in FIG. 1 lies in the mobile communications device 40. The operation of the mobile communications device 40 will be described by reference to FIGS. 4 and 5.

The memory A 514 stores a control program for a sync-determination-and-maintaining operation. In accordance with the control program, the DSP programmable operation section 512 performs a sync-determination-and-maintaining operation, and the sync-determination-and-maintaining section 45 is controlled by the control section 20.

The first despreading code generation section 511 receives a first chip clock signal FC as an operation clock signal and produces and outputs a signal of first despreading code C on the basis of the information output from the control section 20.

The second chip clock signal generation section 540 produces and outputs a second chip clock signal fc (MHz), on the basis of the information output from the control section 20. The second chip clock signal fc can be determined, as in the case of the spreading (despreading) chip rate fc described in connection with FIGS. 1 through 3. Consequently, individual parameters required for maintaining communication can be determined in the same manner as is the spreading (despreading) chip rate signal fc described in connection with FIGS. 1 through 3.

The latch section 530 latches the first despreading code C on the basis of the second chip clock signal fc and generates and outputs a signal of second despreading code C'. Here, the signal of the second despreading code C' can be determined as follows:

(1) On the basis of the second chip clock signal fc, data are sampled every "n" bits with respect to the first despreading code C, and values of the thus-sampled bits are made continuous to a length corresponding to "n" bits, to thereby produce the second despreading code C'.

(2) On the basis of the second chip clock signal fc, the first despreading code C is divided into "m" through "n" bit blocks, and arbitrary bits which are present in the blocks are sampled. The thus-sampled bit data sets are made continuous to a length corresponding to the number of bits of the blocks of interest, to thereby produce a second despreading code C. Preferably, the first despreading code C is divided into blocks at bit positions corresponding to integral multiples of constant R, which is a real number of one or greater. Here, the constant R can be defined as "R=Fc/fc." At this time, bit positions are preferably determined by means of rounding down, up, or off the fractional portion of the integral multiples of constant R.

(3) On the basis of the second chip block signal fc, the first despreading code C is divided into blocks of integral "n"

bits, and arbitrary bits which are present in the blocks are sampled. The thus-sampled bit data are made continuous to a length corresponding to the number of bits provided in the blocks of interest, to thereby produce the second despreading code C'.

(4) There are sampled bits which are present at predetermined locations within a block of the first despreading code C determined on the basis of the second chip clock signal fc. At this time, bits located at predetermined positions may be unified to leading bits of respective blocks.

Subsequently, the second despreading code c' is held by the despreading code tap register 521 of the parallel correlator 520.

The second parallel correlator operation clock signal generation section 550 produces and outputs a second parallel correlator operation clock signal fs, on the basis of the clock signal Fs output from the control section 20.

The parallel correlator 520 despreads the received signal (BB signal) through use of the second despreading code C' and in accordance with the second parallel correlator operation clock signal fs, thus outputting a correlation output P.

The DSP programmable operation section 513 stores the correlation output P into the memory B515, to thereby prepare a delay profile. The thus-prepared delay profile is sent to the control section 20.

The foregoing description has described the mobile communications device, the communications system, and the communications method of the present invention. There will be described in more detail a case where the latch section 530 produces the second despreading code C' from the first despreading code C through processing (1).

Figure 6:
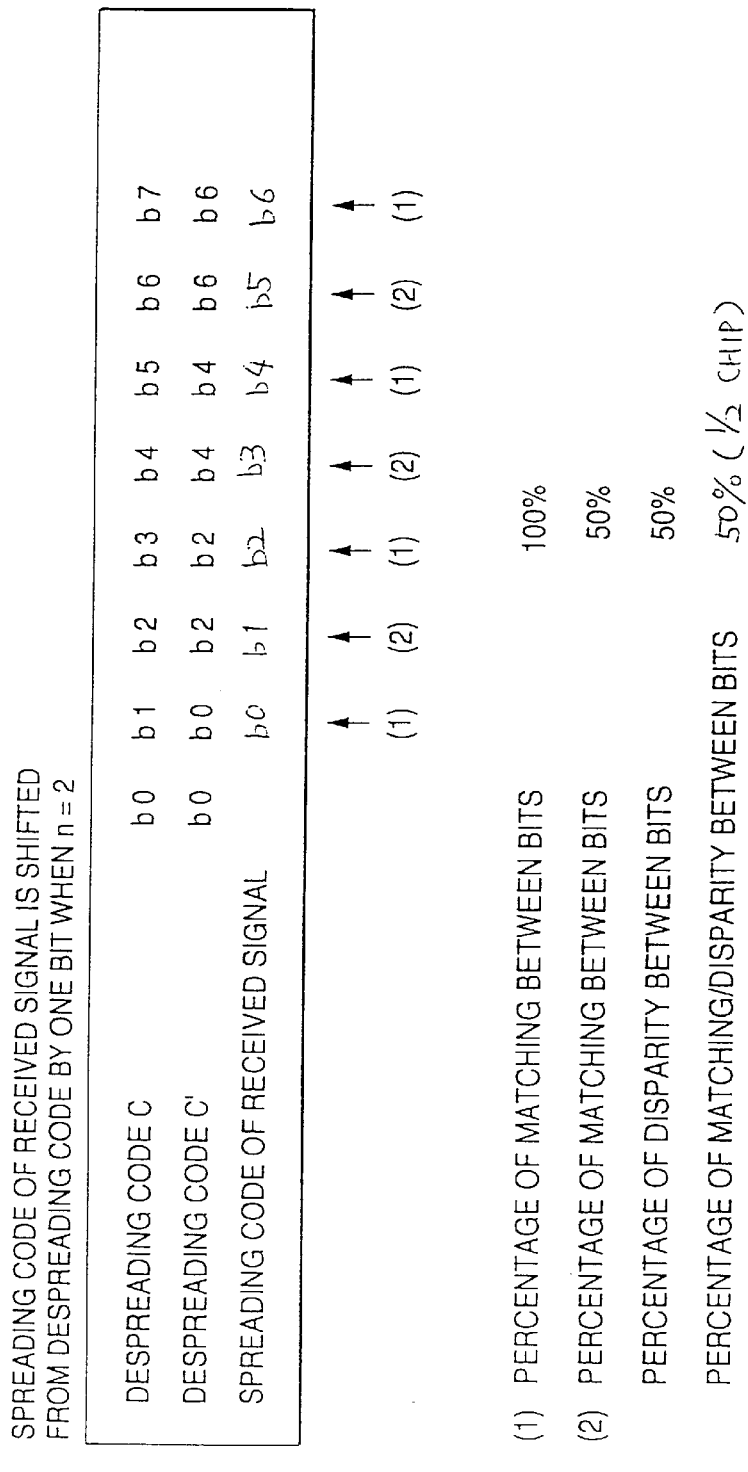
FIG. 6 is an illustrating showing a first despreading code C, a second despreading code C', and a spreading code of a received signal S when n=2.

FIG. 6 is an illustration showing the first despreading code C, the second despreading code C', and the spreading code of a received signal S when n=2. As shown in FIG. 6, in the mobile communications device, the communications system, and the communications method according to the present invention, in a case where n=2 in processing (1), one of two bits inevitably matches the despreading code, if the spreading code of the received signals S is shifted only one bit from the despreading code. Since the first despreading code C has the characteristic of a pseudorandom number, the chance of a match arising between bit data of the remaining one bit assumes a value of ½ (50%) and the chance of a disparity arising between bit data of the remaining one bit assumes a value of ½ (50%). An expected value of a "match/disparity" every two bits assumes a value of 1 (i.e., 100%). Consequently, an expected value of "match/disparity" for each bit assumes a value of ½ (50%).

Figure 7:
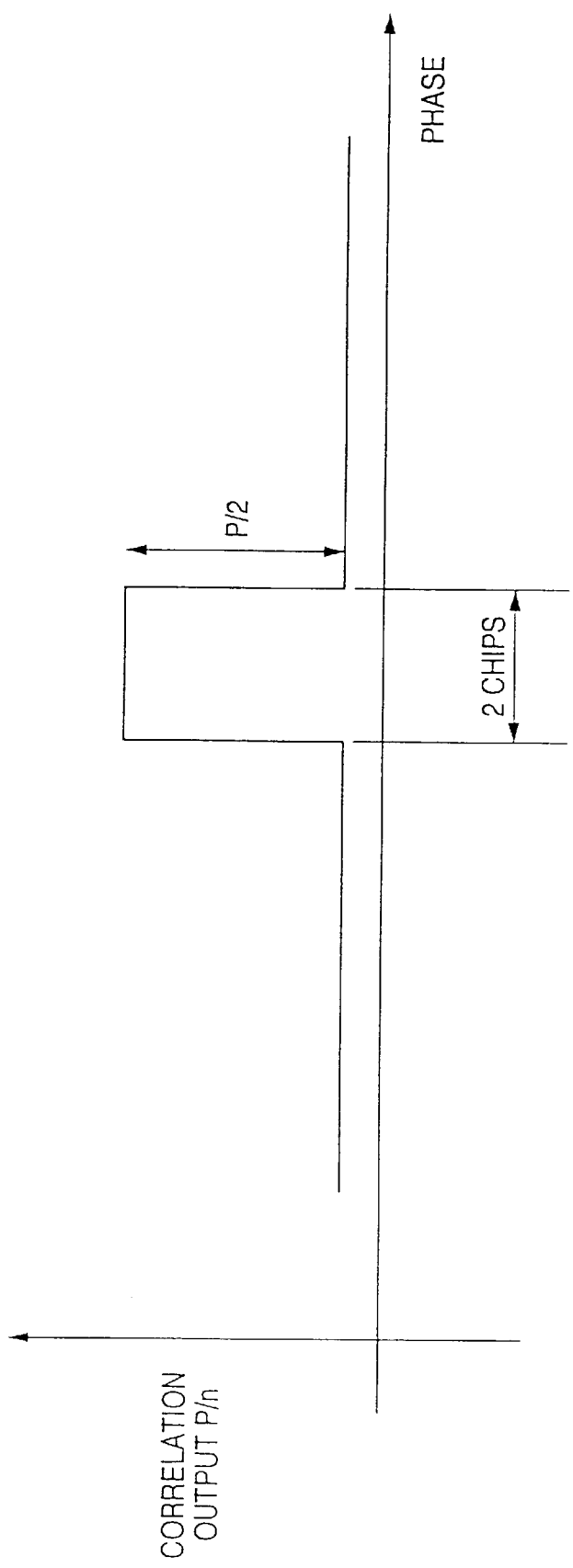
FIG. 7 is a plot showing the relationship between a phase difference $\Theta$ stemming from a despreading operation and a correlation output P/n in a discrete model case at n=2.

FIG. 7 is a plot showing the relationship between a phase difference Θ stemming from a despreading operation and a correlation output P/n in a discrete model case at n=2. As shown in FIG. 7, in a case where the correlation output P is output on the basis of the second despreading code C' determined through processing (1), the correlation output P becomes 1/n times (when n=2, P/2). The width of the phase Θ at which the correlation output P/2 is output is extended to a width corresponding to "n" bits.

Figure 8:
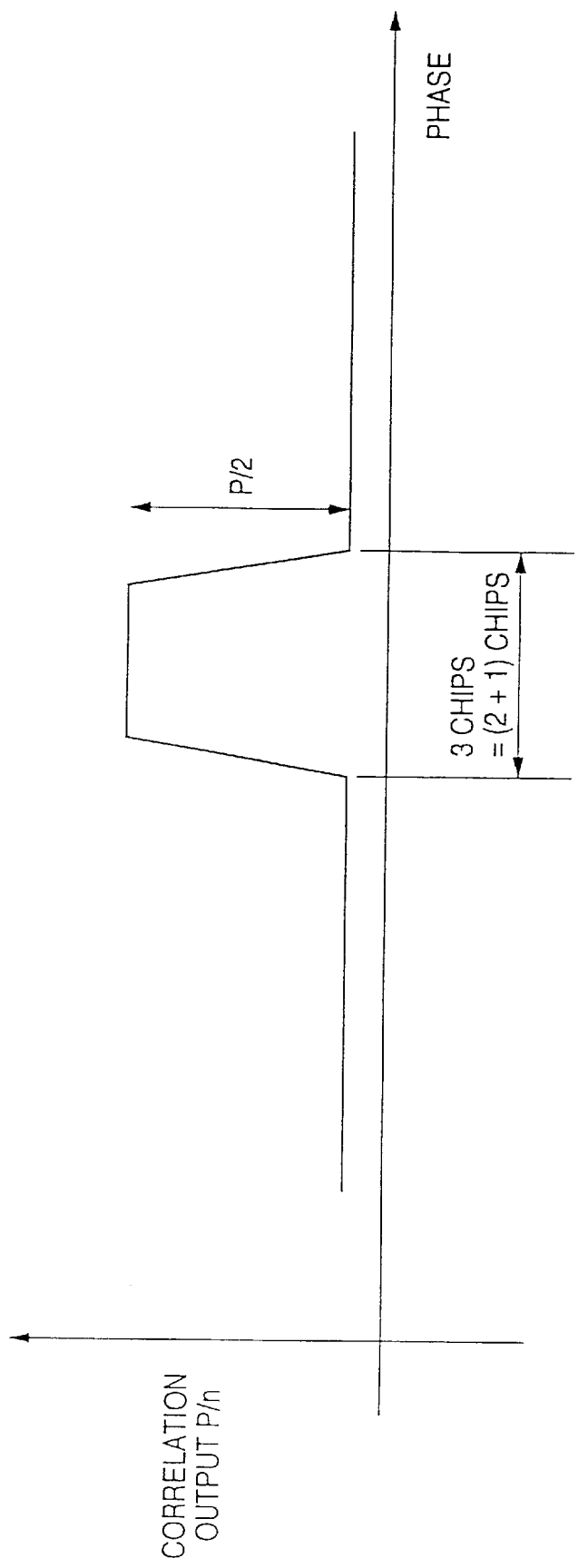
FIG. 8 is a plot showing the relationship between a phase difference $\Theta$ stemming from a despreading operation and a correlation output P/n in a continuous model case at n=2.

FIG. 8 is a plot showing the relationship between a phase difference Θ stemming from a despreading operation and a correlation output P/nina continuous model case at n=2. As shown in FIG. 8, in a case where the correlation output P is output on the basis of the second despreading code C' determined through processing (1), the correlation output P becomes 1/n times (when n=2, P/2). The width of the phase Θ at which the correlation output P/2 is output is extended to a width corresponding to "n+1" bits.

The foregoing description has described the mobile communications device, the communications system, and the communications method of the present invention. During communication, a transmission signal is spread with the first despreading code (=spreading code) C through use of the first chip clock signal Fc at the time of transmission, and at the time of receipt the received signal S is despread with the first despreading code C through use of the first chip clock signal Fc. The sync-determination-and-maintaining section 45 generates the second despreading code C' from the first despreading code C produced on the basis of the first chip clock signal Fc, through use of the second chip clock signal fc. Thus, the received signal S can be despread through use of the second despreading code C'.

Figure 9:
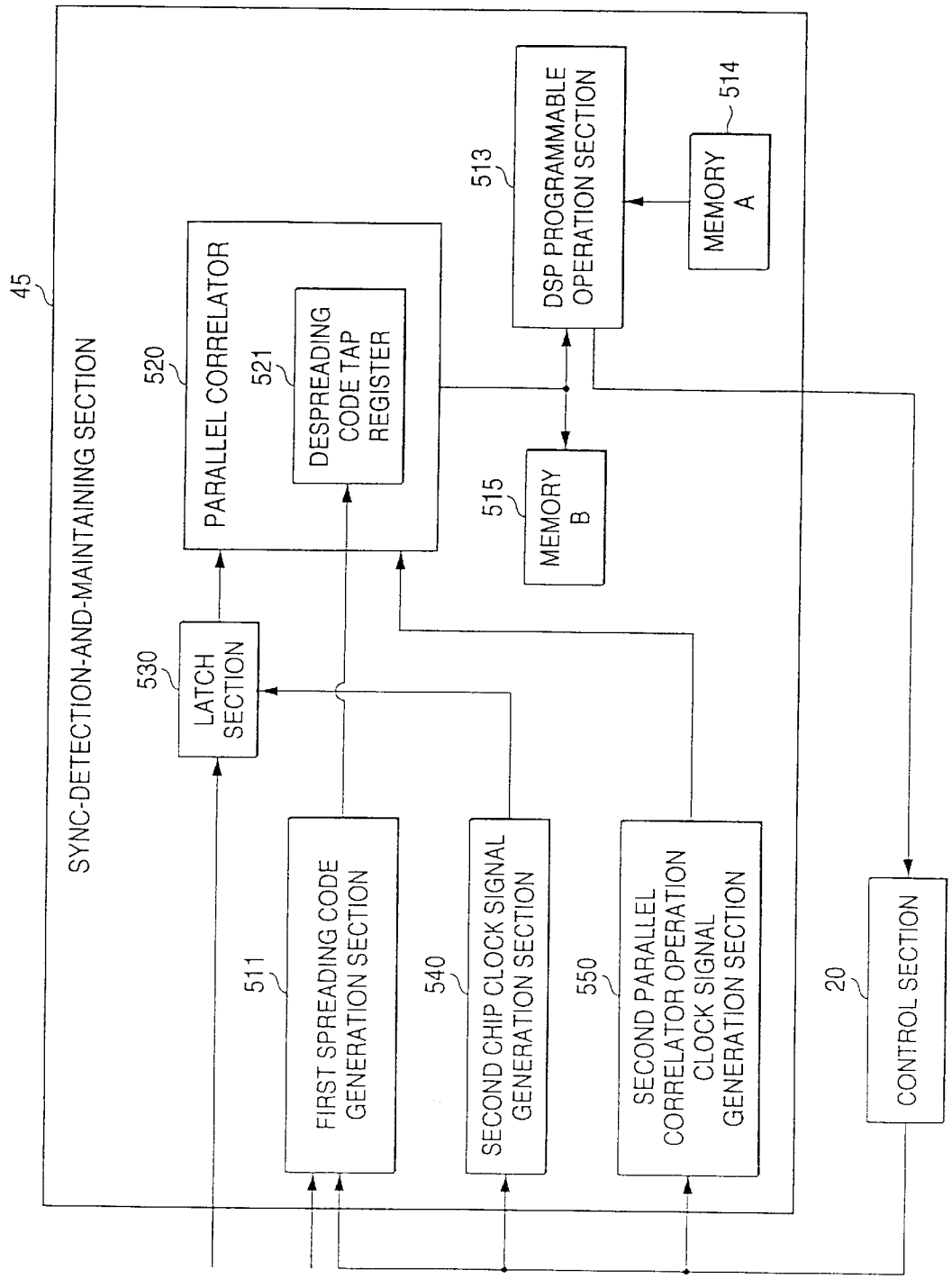
FIG. 9 is a block diagram showing another configuration of a sync-determination-and-maintaining section 45.
Figure 10:
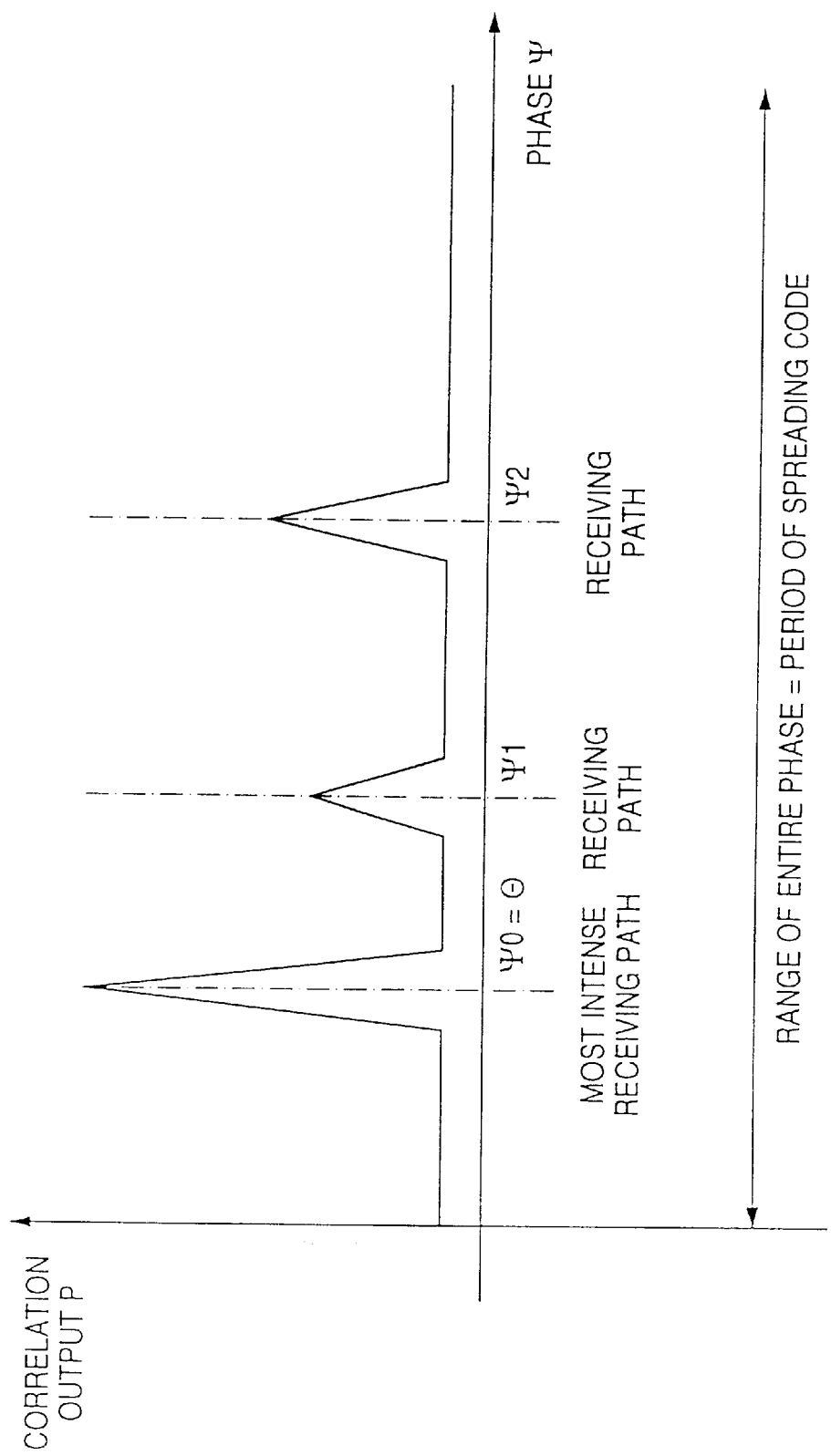
FIG. 10 is a plot showing the relationship between a phase $\psi$ and a correlation output $P(\psi)$.
Figure 11:
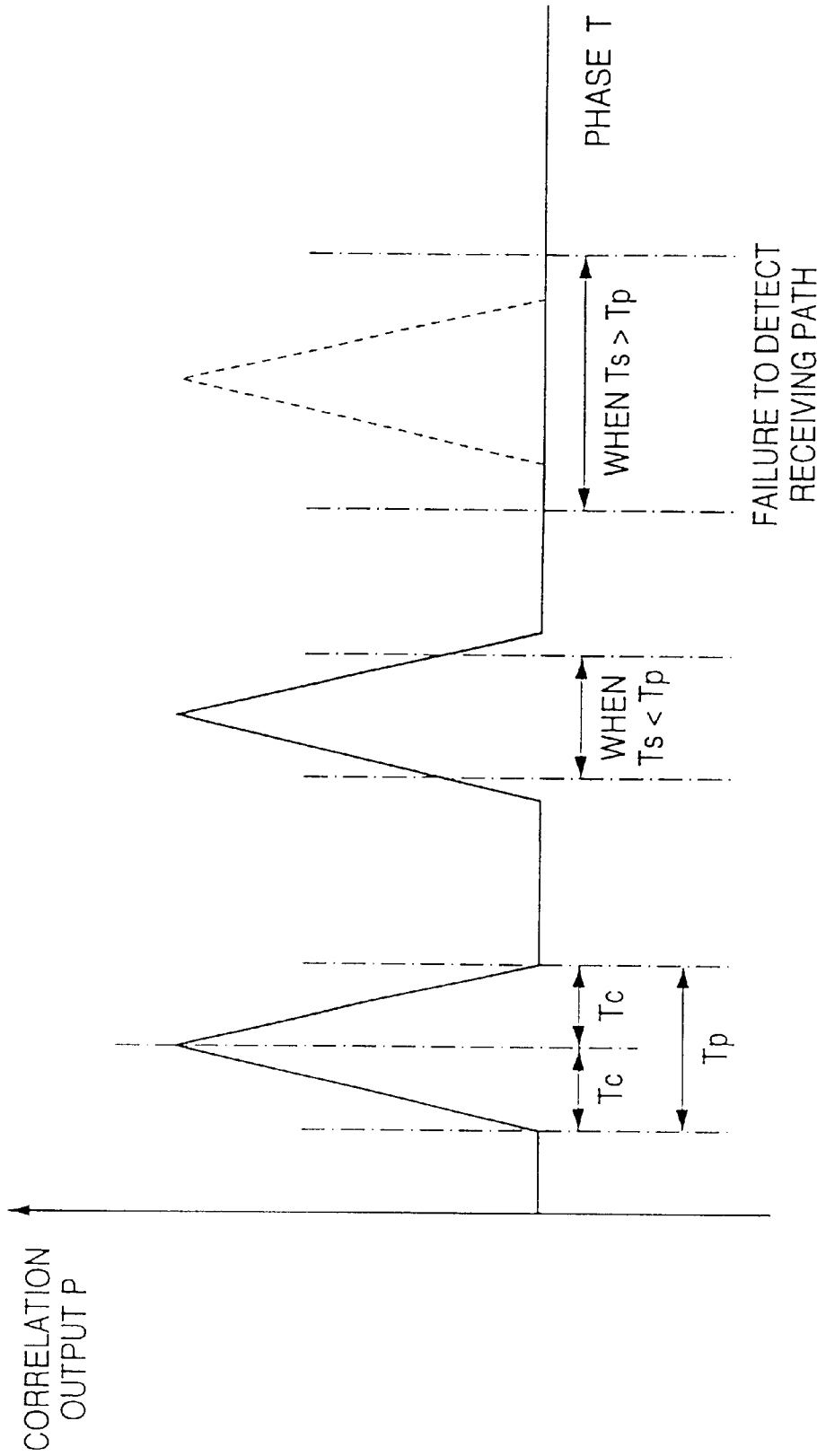
FIG. 11 is a plot showing the relationship between the correlation output P and a phase T.
Figure 12A:
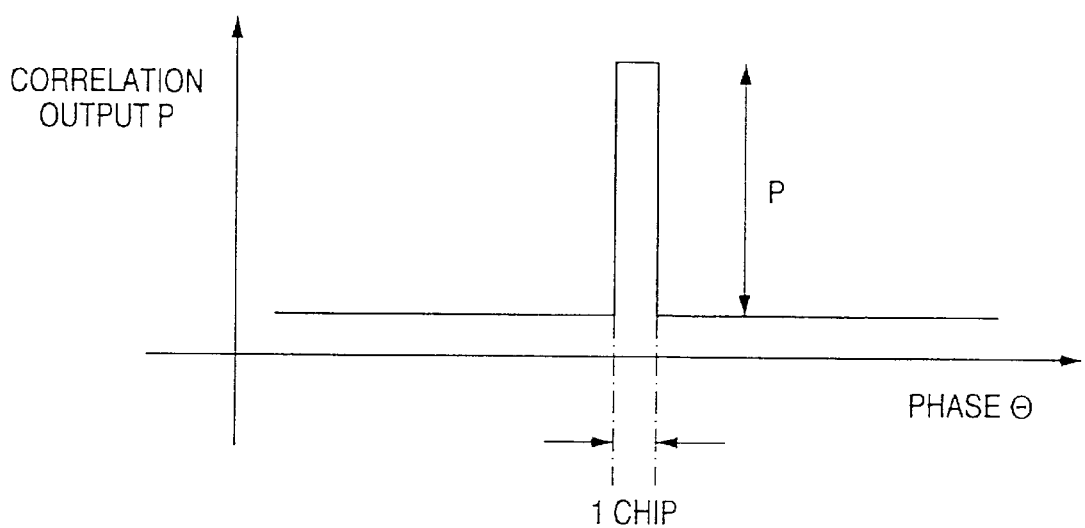
FIGS. 12A and 12B are plots showing the relationship between the correlation output P and the phase $\Theta$.
Figure 12B:
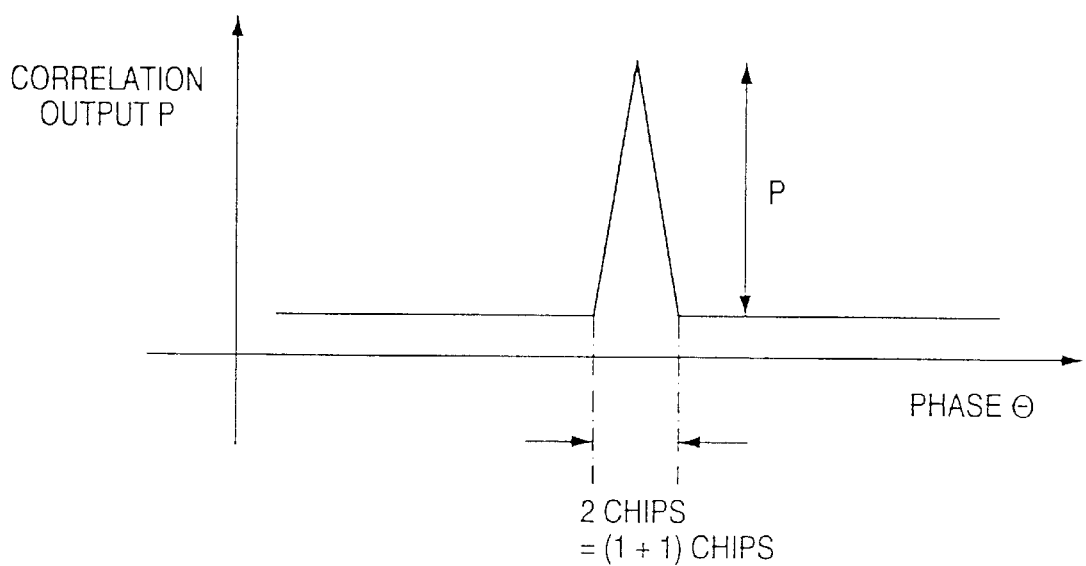
Figure 13:
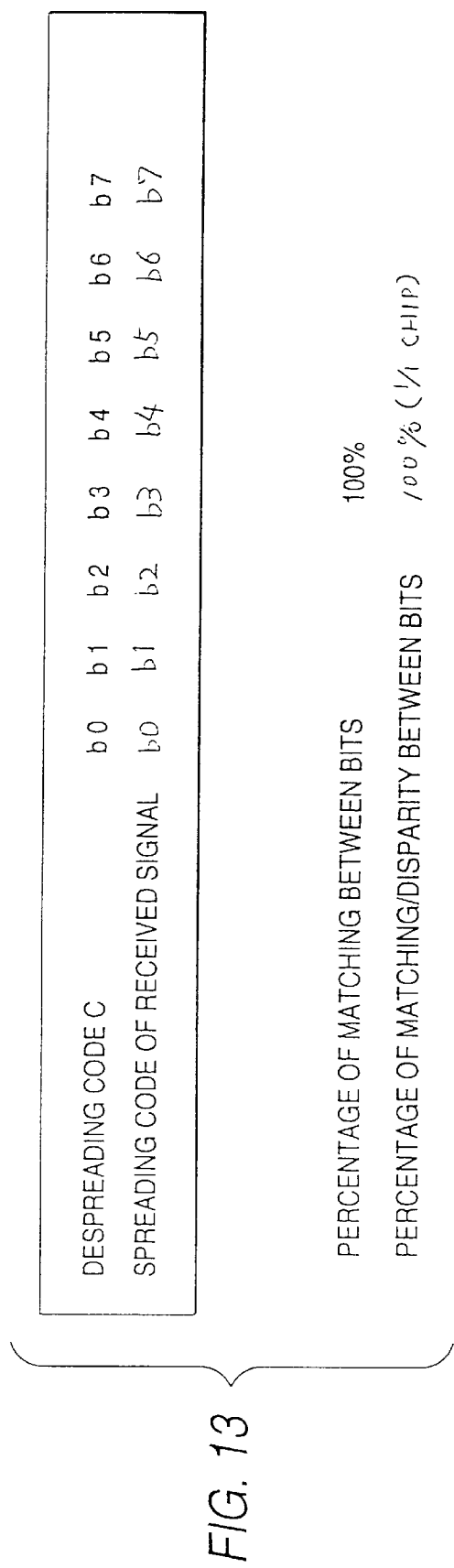
FIG. 13 is an illustration showing the relationship between a despreading code C and a spreading code of a received signal in a case where chips are in phase with each other.
Figure 14:
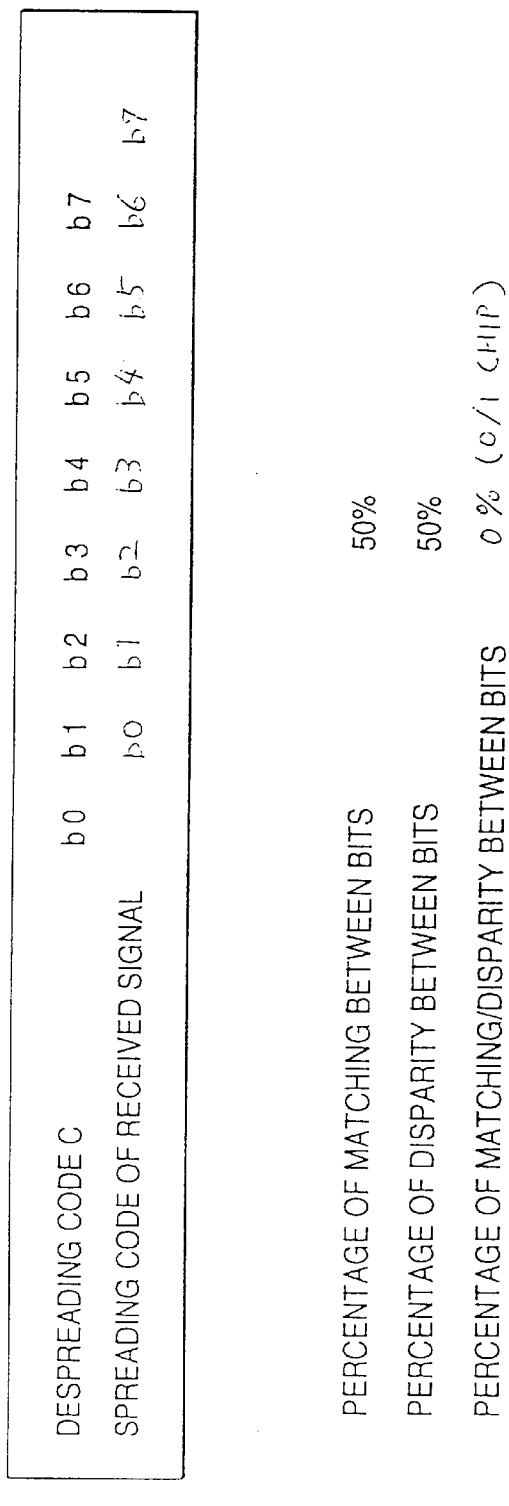
FIG. 14 shows the relationship between the despreading code C and the spreading code of the received signal in a case where chips are out of phase with by one bit.

FIG. 9 is a block diagram showing another configuration of a sync-determination-and-maintaining section 45. As shown in FIG. 9, the sync-determination-and-maintaining section 45 comprises a first despreading code generation section 511 for generating a first despreading code C on the basis of a first chip clock Fc (MHz) signal generated by the first chip clock signal generation section and despreading information output from the control section 20; a second chip clock signal generation section 540 for generating a second chip clock signal fc (MHz) (hereinafter referred to also as "despreading chip rate") on the basis of a clock signal output from the control section 20; a second parallel correlator operation clock signal generation section 550 for generating a second operation clock signal fs (MHz) of a parallel correlator 520 to be described later, on the basis of the clock signal Fs (MHz) output from the control section 20; a latch section 530 for generating a latched received signal S' by means of latching the received signal at the second chip clock signal fc; a parallel correlator 520 which is provided with a despreading code tap register 521 for temporarily storing the first despreading code C output from the first despreading code generation section 511 and which outputs a correlation output P through use of a signal S' latched by the latch section 530, on the basis of the first despreading code C and the second operation clock signal fs output from the second parallel correlator operation clock signal generation section 550; memory B 515 for storing the correlation output p output from the parallel correlator 520; and a DSP programmable operation section 513 which operates in accordance with a control program output from the memory A 514 and prepares a delay profile on the basis of the correlation output P stored in the memory B 515.

As mentioned above, the principal difference between the sync-determination-and-maintaining section 45 shown in FIG. 9 and the sync-determination-and-maintaining section 36*b* shown in FIG. 5 lies not in the first despreading code C but in the received signal S. The operation of the mobile communications device 40 will be described by reference to FIGS. 4 and 9.

The memory A 514 stores a control program for a sync-determination-and-maintaining operation. In accordance with the control program, the DSP programmable operation section 513 performs a sync-determination-and-maintaining operation, and the sync-determination-and-maintaining section 45 is controlled by the control section 20.

The first despreading code generation section 511 receives a first chip clock signal FC as an operation clock signal and produces and outputs a signal of first despreading code C on the basis of the information output from the control section 20.

The second chip clock signal generation section 540 produces and outputs a second chip clock signal fc (MHz), on the basis of the information output from the control section 20. The second chip clock signal fc can be determined, as in the case of the spreading (despreading) chip rate fc described in connection with FIGS. 1 through 3. Consequently, individual parameters required for maintaining communication can be determined in the same manner as is the spreading (despreading) chip rate signal fc described in connection with FIGS. 1 through 3.

On the basis of the second chip clock signal fc, the latch section 530 latches the received signal S having a code sequence D, and generates and outputs a latched received signal S' having a code sequence D'. Here, the latched received signal S' having a code sequence D' can be determined as follows:

(1) On the basis of the second chip clock signal fc, data are sampled every "n" bits with respect to the code sequence D of the received signal S, and values of the thus-sampled bits are made continuous to a length corresponding to "n" bits, to thereby produce the code sequence D'.

(2) On the basis of the second chip clock signal fc, the code sequence D of the received signal S is divided into "m", through "n" bit blocks, and arbitrary bits which are present in the blocks are sampled. The thus-sampled bit data sets are made continuous to a length corresponding to the number of bits of the blocks of interest, to thereby produce a code sequence D'. The code sequence D of the received signal S is preferably divided into blocks at bit positions corresponding to integral multiples of constant R, which is a real number of one or more. Here, the constant R can be defined as "R=Fc/fc." At this time, bit positions are preferably determined by means of rounding down, up, or off the fractional portion of integral multiples of constant R.

(3) On the basis of the second chip block signal fc, the code sequence D of the received signal S is divided into blocks of integral "n" bits, and arbitrary bits which are present in the blocks are sampled. The thus-sampled bit data are made continuous to a length corresponding to the number of bits provided in the blocks of interest, to thereby produce the code sequence D'.

(4) There are sampled bits which are present at predetermined locations within a block of the code sequence D of the received signal S determined on the basis of the second chip clock signal fc. The thus-sampled bit data are made continuous to a length corresponding to the number of bits provided in the blocks of interest, to thereby produce the code sequence D'. At this time, bits located at predetermined positions may be unified to leading bits of respective blocks.

The despreading code tap register 521 of the parallel correlator 520 holds the first despreading code C output from the first despreading code generation section 511.

The second parallel correlator operation clock signal generation section 550 produces and outputs a second parallel correlator operation clock signal fs, on the basis of the clock signal Fs output from the control section 20.

The parallel correlator 520 despreads the received signal (BB signal) through use of the code sequence D' or the first despreading code C in accordance with the second parallel correlator operation clock signal fs, thus outputting a correlation output P.

The DSP programmable operation section 513 stores the correlation output P into the memory B 515, to thereby prepare a delay profile. The thus-prepared delay profile is sent to the control section 20.

The foregoing description has described the mobile communications device, the communications system, and the communications method of the present invention. During communication, a transmission signal is spread with the first despreading code C through use of the first chip clock signal Fc at the time of transmission, and at the time of receipt the received signal S is despread with the first despreading code C through use of the first chip clock signal Fc. Alternatively, the sync-determination-and-maintaining section 45 may be arranged so as to generate the first despreading code C with the first chip clock signal Fc, produce the code sequence D' through use of the second chip clock signal fc, and despread the latched received signal S' through use of the code sequence d' or the first despreading code C.

The phase of the code sequence D of the received signal S is shifted by means of the first chip clock signal Fc, to thereby produce a digital signal Sd, and the latch section 530 latches the thus-produced digital signal Sd through use of the second chip clock signal fc output from the second chip clock signal generation section 540, to thereby produce a latched signal Sd'. The parallel correlator 520 may despread the latched signal Sd'through use of the first despreading code C at the second parallel correlator operation clock signal fs, to thereby produce a correlation output P.

On the basis of the second chip clock signal fc, the latch section 530 may directly latch the received signal S, to thereby produce a latched received signal S'.

The sync-determination-and-maintaining section 45 shown in FIGS. 5 and 9 may control the second parallel correlator clock signal fs (MHz) [having a period ts (s)] required for performing a sync-detection-and-maintaining operation, on the basis of the second chip clock signal fc [having a period tc (s)]. Conversely, the second chip clock signal fc may be determined on the basis of the second parallel correlator operation clock signal fs. The period ts (s) of the second parallel correlator operation clock signal fs or the period ts (s) of the second chip clock signal fc may be set so as to satisfy Equation 23 provided below.

$$ts<tc-Tc$$

or $$tc-Tc \leq ts < tc+Tc \quad (23)$$

Here, Tc (s) represents the period of the clock signal Fc (MHz) output from the control section, and ts<tc (fc<fs).

The relationship between the second parallel correlator operation clock signal fs and the second chip clock signal fc can be defined by Equation 24 provided below.

$$fs = \alpha 0 * fc + \beta 0$$

∵α0 is a predetermined value satisfying 0<α0, and β0 is a constant. (24)

Equation 24 and "tc−Tc≦ts<tc+Tc" of Equation 23 can be modified to "ts=tc−Tc−α1 (α1 is a predetermined value satisfying 0≦α1)" or "tc−Tc<ts<tc+Tc."

During communication, the period Ts of the clock signal Fs may be taken as the unit for controlling the phase of despreading at the time of receipt. Further, the sync-detection-and maintaining section 45 may employ the second chip clock signal fc as an operation clock signal.

In a case where synchronization of the received signal is achieved by use of the second parallel correlator operation clock signal fs, synchronization is again detected in the vicinity of the phase of the second parallel phase correlator operation clock signal fs, through use of the clock signal Fs, thus improving the accuracy of communication. At this time, the second parallel correlator operation clock signal fs may be set so as to satisfy fs≦Fs.

In the communications system shown in FIGS. 1 and 5, the despreading rate N may be determined on the basis of the communication quality target value Q0. Alternatively, the despreading rate N may be determined on the basis of the communication quality target value Q0 or the upper value Q1 and the lower value Q2 of the communication quality target value Q0.

Further, the despreading rate N may be determined on the basis of a measured or expected value of receiving communication quality (communication quality Q). At the time of processing of communication quality Q, when BER is converted into SIR, an error function may be employed for conversion to communication quality Q.

The despreading rate N may be determined on the basis of the communication quality Q and the communication quality target value Q0, or the upper value Q1 and the lower value Q2 of the communication quality target value Q0. At this time, a difference ΔN (dB) of the despreading rate N obtained during communication can be changed to a monotonous decrease of Q-Q0 (dB). More specifically, in a case where communication quality Q is processed by SIR or Eb/N0, Equation 25 provided below is satisfied.

$$\Delta N(dB) = -(Q-Q0)(dB) \quad (25)$$

When Q<W0, N may be made greater. In contrast, when Q0<Q, N may be made smaller. Alternatively, when Q<Q2, N may be made greater. When Q1<Q2, N may be made smaller.

As mentioned above, in the mobile communications device, the communications system, and the communications method according to the present invention, even in the case of spread-spectrum communication in which the spreading (despreading) chip rate fc of a mobile station is fixed, a mobile communications device (i.e., the mobile station) can select a different second receiving chip rate Fc by means of a latch section provided in the sync-detection-and-maintaining section, thus achieving the advantages as discussed above.

As has been described above, in the mobile communications device, the communications system, and the communications method according to the present invention, the mobile communications device (i.e., the mobile station) can select a different chip rate fc, thereby enabling easy control of the power consumed by the mobile communications device and flexible extension of communication time and call-await time.

In the event that hardware resources, such as memory and the computation capability of a mobile communications device (i.e., the mobile station) used for a sync-detection-and-maintaining operation, become deficient, the amount of hardware resource used can be readily diminished. At that time, billing is calculated on the basis of the power used for transmission, and hence a higher payment is charged to the user who requests the cell station to provide greater transmission power and enjoys convenience, thus enabling establishment of a rational and equitable communications system.

Even when a communications system employs a fixed spreading chip rate Fc, the latch section provided in the sync-detection-and-maintaining section enables the mobile communications device (or the mobile station) to select a different second receiving chip rate fc, thus achieving the advantages as discussed above.

What is claimed is:

1. A mobile communications device comprising:
control means for controlling communication; and
communications means for establishing data communication with respect to a cell station, said communications means comprising:
first chip clock signal generation means for generating a first chip clock signal Fc;
transceiver means for effecting transmission of information; and
sync detection and maintaining means for preparing a delay profile, said sync detection and maintaining means including:
despreading code generation means for generating a first despreading code C on the basis of the first chip clock signal Fc output from the first chip clock signal generation means and despreading information output from the control means;
chip clock signal generation means for generating a chip clock signal fc on the basis of the first chip clock signal Fc output from the first chip clock signal generation means;
operation clock signal generation means for generating an operation clock signal fs on the basis of the clock rate value output from the control means;
latch means for generating a second despreading code C' by means of latching the first despreading code C;
a parallel correlator which extracts a correlation output P from a signal S received by the transceiver means on the basis of the second despreading code C' and the operation clock signal fs; and
computation means for preparing a delay profile on the basis of the correlation output P.

2. The mobile communications device as defined in claim 1, wherein the latch means samples data, on the basis of the chip clock signal fc, data are sampled every "n" bits with respect to the first despreading code C, and makes values of the thus sampled bits continuous to a length corresponding to An" bits, to thereby produce the second despreading code C'.

3. The mobile communications device as defined in claim 1, wherein on the basis of the chip clock signal fc, the latch means divides the first despreading code C into "m" through "n" bit blocks, samples arbitrary bits which are present in the blocks, and makes the thus sampled bit data sets continuous to a length corresponding to the number of bits of the blocks of interest, to thereby produce the second despreading code C'.

4. The mobile communications device as defined in claim 1, wherein, on the basis of the chip block signal fc, the latch means divides the first despreading code C into blocks of integral "n" bits, samples arbitrary bits which are present in the blocks, and makes the thus sampled bit data continuous to a length corresponding to the number of bits provided in the blocks of interest, to thereby produce the second despreading code C'.

5. The mobile communications device as defined in claim 1, wherein the latch means, on the basis of the chip clock signal fc, samples bits which are present at predetermined locations within a block of the first despreading code C and makes the thus sampled bits continuous to a length corresponding to the number of bits provided in the blocks of interest, to thereby produce the second despreading code C'.

6. The mobile communications device as defined in claim 1, wherein the control means spreads transmission data on the basis of the first chip clock signal Fc and the first despreading code C and despreads received data on the basis of the chip clock signal Fc and the first despreading code C.

7. The mobile communications device as defined in claim 1, further comprising a user interface for enabling entry of data or indication of information.

8. The mobile communications device as defined in claim 1, wherein the control means determines the target communication quality value Q0.

9. The mobile communications device as defined in claim 1, wherein the control means determines a data transmission symbol rate fv for communication.

10. A communications system including
a plurality of mobile communications devices for transmitting and receiving information by means of communication, a cell station which receives communication requests output from the plurality of mobile communications devices and controls communication between the mobile communications devices, and a control station for calculating a communication rate M at which the plurality of mobile communications devices are charged, wherein
the mobile communications devices correspond to the mobile communications device as defined in claim 1, and
the cell station adopts a different chip clock signal fc for the communication established by each of the mobile communications devices.

11. A mobile communications comprising:
control means for controlling communication; and
communications means for establishing data communication with respect to a cell station, said communications means comprising:
first chip clock signal generation means for generating a first chip clock signal Fc;
transceiver means for effecting transmission of information; and
sync detection and maintaining means for preparing a delay profile, said sync detection and maintaining means including:
despreading code generation means for generating a first despreading code C on the basis of the first chip clock signal Fc output from the first chip clock signal generation means and despreading information output from the control means;
chip clock signal generation means for generating a chip clock signal fc on the basis of the first chip clock signal Fc output from the first chip clock signal generation means;
operation clock signal generation means for generating an operation clock signal fs on the basis of the clock signal Fs output from the control means;
latch means for generating a latched received signal S' by means of latching, in accordance with the chip clock signal fc, the signal S received by the transceiver means;
a parallel correlator which extracts a correlation output P from a signal S received by the transceiver means on the basis of the first despreading code C and the operation clock signal fs; and
computation means for preparing a delay profile on the basis of the correlation output P.

12. The mobile communications device as defined in claim 1, wherein the latch means latches, on the basis of the chip clock signal fc, a code sequence D of the received signal S, to thereby produce a code sequence D', whereby a latched received signal S' having a code sequence D' is produced.

13. The mobile communications device as defined in claim 11, wherein the control means spreads transmission data on the basis of the first chip clock signal Fc and the first despreading code C and despreads received data on the basis of the chip clock signal Fc and the first despreading code C.

14. The mobile communications device as defined in claim 11, further comprising a user interface for enabling entry of data or indication of information.

15. The mobile communications device as defined in claim 11, wherein the control means determines the target communication quality value Q0.

16. The mobile communications device as defined in claim 11, wherein the control means determines a data transmission symbol rate fv for communication.

17. A communications system including
a plurality of mobile communications devices for transmitting and receiving information by means of communication, a cell station which receives communication requests output from the plurality of mobile communications devices and controls communication between the mobile communications devices, and a control station for calculating a communication rate M at which the plurality of mobile communications devices are charged, wherein
the mobile communications devices correspond to the mobile communications device as defined in claim 11, and
the cell station adopts a different chip clock signal fc for the communication established by each of the mobile communications devices.

18. A communications method to be performed by:
a plurality of mobile communications devices for transmitting and receiving information by means of communication, a cell station which receives communication requests output from the plurality of mobile communications devices and controls communication between the mobile communications devices, and a control station for calculating a communication rate M at which the plurality of mobile communications devices are charged, the method comprising the steps of:
causing a mobile communications device for issuing a communication request to determine and send, to the cell station, a data transmission symbol rate fv, a target communication quality value Q0, and a chip rate fc;
causing the cell station to determine whether or not communication is available, on the basis of the data transmission symbol rate fv, the target communication quality value Q0, and the chip rate fc;
causing the control station to determine the communication rate M on the basis of the chip rate fc in a case where communication is available;
causing the mobile communications device to determine whether to start communication, on the basis of the communication rate, as well as an optimum chip rate fc;
causing the mobile communications device to monitor communication quality Q; and
determining a plurality of communication parameters on the basis of the chip rate fc, to thereby maintain communication through use of the plurality of communication parameters.

19. The communications method as defined in claim 18, wherein, in a case where it is determined that communication requiring the data transmission symbol rate fv, the target communication quality value Q0, and the chip rate fc is disapproved, the step of determining whether or not communication is available involves repetition of steps of: sending, to the mobile communications device, a data transmission symbol rate fv', a target communication quality value Q0', and a chip rate fc', which enable approval of communication; and causing the mobile communications device to newly determine and send, to the cell station, another data transmission symbol rate fv, another target communication quality value Q0, and another chip rate fc, on the basis of the mobile communications device a data transmission symbol rate fv', a target communication quality value Q0', and a chip rate fc'.

20. The communications method as defined in claim 18, wherein, in a case where the communication quality Q is inferior to the target communication quality value Q0, the step of monitoring the communication quality Q involves an operation for sending a request to the cell station for increasing transmission power Pw and an operation for causing the cell station to update the chip rate fc in response to the request, to thereby increase the transmission power Pw, and the step of maintaining communication involves an operation for updating of the plurality of communication parameters on the basis of the thus updated chip rate fc and an operation for maintaining communication through use of the communication parameters.

* * * * *

UNITED STATES PATENT AND TRADEMARK OFFICE
CERTIFICATE OF CORRECTION

PATENT NO. : 6,738,412 B1
DATED : May 18, 2004
INVENTOR(S) : Tadashi Hayakawa

It is certified that error appears in the above-identified patent and that said Letters Patent is hereby corrected as shown below:

Column 2,
Line 47, please delete "here", and insert therefor -- where --.

Column 4,
Line 34, please delete "the 20 control", and insert therefor -- the control --.

Column 5,
Line 2, please delete "$0\leqq\alpha$", and insert therefor -- $0\leq\alpha$ --.

Column 8,
Line 31, please delete "$0\leqq\alpha$", and insert therefor -- $0\leq\alpha$ --.

Column 17,
Lines 44-45, please delete "T1=$\lambda$kc/V.", and insert therefor -- T1=$\lambda$c/V. --.

Column 18,
Line 29, please delete "$0\leqq\alpha\alpha$", and insert therefor -- $0\leq\alpha$ --.

Column 23,
Line 63, please delete "correlator 5to", and insert therefor -- correlator 520 to --.

Column 25,
Line 61, please delete "P/nina", and insert therefor -- P/n in a --.

UNITED STATES PATENT AND TRADEMARK OFFICE
CERTIFICATE OF CORRECTION

PATENT NO. : 6,738,412 B1
DATED : May 18, 2004
INVENTOR(S) : Tadashi Hayakawa

It is certified that error appears in the above-identified patent and that said Letters Patent is hereby corrected as shown below:

<u>Column 31,</u>
Lines 54-55, please delete "as defined in claim 1,", and insert therefor -- as defined in claim 11 --.

Signed and Sealed this

Twenty-seventh Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,738,412 B1
DATED : May 18, 2004
INVENTOR(S) : Tadashi Hayakawa

It is certified that error appears in the above-identified patent and that said Letters Patent is hereby corrected as shown below:

Column 4,
Line 34, please delete "$T1 \leqq T0 \leqq T2$", and insert therefor -- $T1 \leq T0 \leq T2$ --.

Column 17,
Line 28, please delete "$T1 \leqq T0 \leqq T2$", and insert therefor -- $T1 \leq T0 \leq T2$ --.

Signed and Sealed this

Fifteenth Day of March, 2005

JON W. DUDAS
*Director of the United States Patent and Trademark Office*